US012572746B2

(12) United States Patent
Iakovenko et al.

(10) Patent No.:  US 12,572,746 B2
(45) Date of Patent:  ***Mar. 10, 2026

(54) DEEP LEARNING SYSTEMS AND METHODS TO DISAMBIGUATE FALSE POSITIVES IN NATURAL LANGUAGE PROCESSING ANALYTICS

(71) Applicant: Nuix Limited, Sydney (AU)

(72) Inventors: Oleksandr Iakovenko, Odesa (UA); William Kelly, Jamaica Plain, MA (US); Stephen Land Stewart, Jenkintown, PA (US)

(73) Assignee: Nuix Limited, Sydney (AU)

( * ) Notice: Subject to any disclaimer, the term of this patent is extended or adjusted under 35 U.S.C. 154(b) by 291 days.

This patent is subject to a terminal disclaimer.

(21) Appl. No.: 18/121,360

(22) Filed: Mar. 14, 2023

(65) Prior Publication Data

US 2023/0289531 A1     Sep. 14, 2023

Related U.S. Application Data

(63) Continuation-in-part of application No. 17/694,243, filed on Mar. 14, 2022, now Pat. No. 12,197,855.

(51) Int. Cl.
*G06F 40/20*        (2020.01)
*G06F 40/295*       (2020.01)
*G06F 40/30*        (2020.01)

(52) U.S. Cl.
CPC ............ *G06F 40/295* (2020.01); *G06F 40/30* (2020.01)

(58) Field of Classification Search
CPC ...... G06F 40/284; G06F 40/30; G06F 40/216;
G06F 40/279; G06F 16/93; G06F 18/211;
G06F 18/214; G06F 18/217; G06F 18/24;
G06F 40/166; G06F 40/295; G06F 40/20;
G06F 40/44
See application file for complete search history.

(56) References Cited

U.S. PATENT DOCUMENTS

| | | | | |
|---|---|---|---|---|
| 8,024,413 B1 * | 9/2011 | Kolcz | .................... | G06F 18/21 |
| | | | | 706/20 |
| 8,509,396 B2 * | 8/2013 | Jan | .......................... | G06F 40/30 |
| | | | | 379/88.03 |
| 8,620,842 B1 | 12/2013 | Cormack | | |
| 8,713,023 B1 | 4/2014 | Cormack et al. | | |

(Continued)

OTHER PUBLICATIONS

International Search Report and Written Opinion for International Application No. PCT/US2023/015192, mailed Jun. 1, 2023 (11 pages).

(Continued)

*Primary Examiner* — Abdelali Serrou
(74) *Attorney, Agent, or Firm* — Nutter McClennen & Fish LLP

(57)        ABSTRACT

Embodiments improve a document classification system by adjusting the class vector of each class based on embedded vectors of documents known to have been misclassified by the system. Some embodiments use a set of misclassified documents to adjust the class vector of the class into which a document has been misclassified. Some embodiments use a set of misclassified documents to adjust the class vector of the pre-assigned class of each misclassified document. Embodiments of adjusting the class vector may be described as machine learning.

8 Claims, 10 Drawing Sheets

400

Provide a plurality of pre-specified class vectors    410

Provide a test set of pre-categorized documents    420

451    Classify documents of the test set    430

Identify documents from the test set that were misclassified    440

Adjust class vector for each class based on vectors of documents misclassified into that class    450

(56) References Cited

U.S. PATENT DOCUMENTS

| | | | | |
|---|---|---|---|---|
| 8,838,606 | B1 | 9/2014 | Cormack et al. | |
| 9,122,681 | B2 | 9/2015 | Cormack et al. | |
| 9,678,957 | B2 | 6/2017 | Cormack et al. | |
| 9,928,234 | B2 * | 3/2018 | Kolotienko | G06F 40/211 |
| 10,229,117 | B2 | 3/2019 | Cormack et al. | |
| 10,242,001 | B2 | 3/2019 | Cormack et al. | |
| 10,353,961 | B2 | 7/2019 | Cormack et al. | |
| 10,445,374 | B2 | 10/2019 | Cormack et al. | |
| 10,671,675 | B2 | 6/2020 | Cormack et al. | |
| 10,817,781 | B2 * | 10/2020 | Skiles | G06F 3/0486 |
| 11,080,340 | B2 | 8/2021 | Cormack et al. | |
| 11,157,829 | B2 * | 10/2021 | Kurata | G06N 3/08 |
| 2012/0030157 | A1 * | 2/2012 | Tsuchida | G06N 20/00 |
| | | | | 706/20 |
| 2015/0019211 | A1 * | 1/2015 | Simard | G06F 3/0482 |
| | | | | 704/10 |
| 2015/0324451 | A1 * | 11/2015 | Cormack | G06F 16/285 |
| | | | | 706/11 |
| 2018/0052818 | A1 * | 2/2018 | Bethard | G06F 16/35 |
| 2018/0349388 | A1 | 12/2018 | Skiles et al. | |
| 2018/0357531 | A1 * | 12/2018 | Giridhari | G06F 18/24 |
| 2022/0198316 | A1 * | 6/2022 | Mazor | G06F 40/30 |

OTHER PUBLICATIONS

Le, Q., et al.—Distributed Representations of Sentences and Documents, dated May 22, 2014, 9 pages.

* cited by examiner

100

101

102

300

310 Provide class vectors

320 Provide documents to be classified

361

330 Obtain embedding vector for document to be classified

340 Determine class vector closest to the document's embedding vector

350 Assign document to class associated with closest class vector

360 Another document?

Yes

No

End

400

410

Provide a plurality of pre-specified class vectors

420

Provide a test set of pre-categorized documents

451

430

Classify documents of the test set

440

Identify documents from the test set that were misclassified

450

Adjust class vector for each class based on vectors of documents misclassified into that class

600

610 — Categorize Test Set

620 — Identify misclassified documents

650 — Change Inputs

630 — Adjust Class Vectors

640 — Another Iteration?

Yes

No

End

700 ⟶

710   Identify misclassified documents

720   Find error depths

730   Determine tuning intensity for each class

740   Recalculate class definition for each class

741 →

742

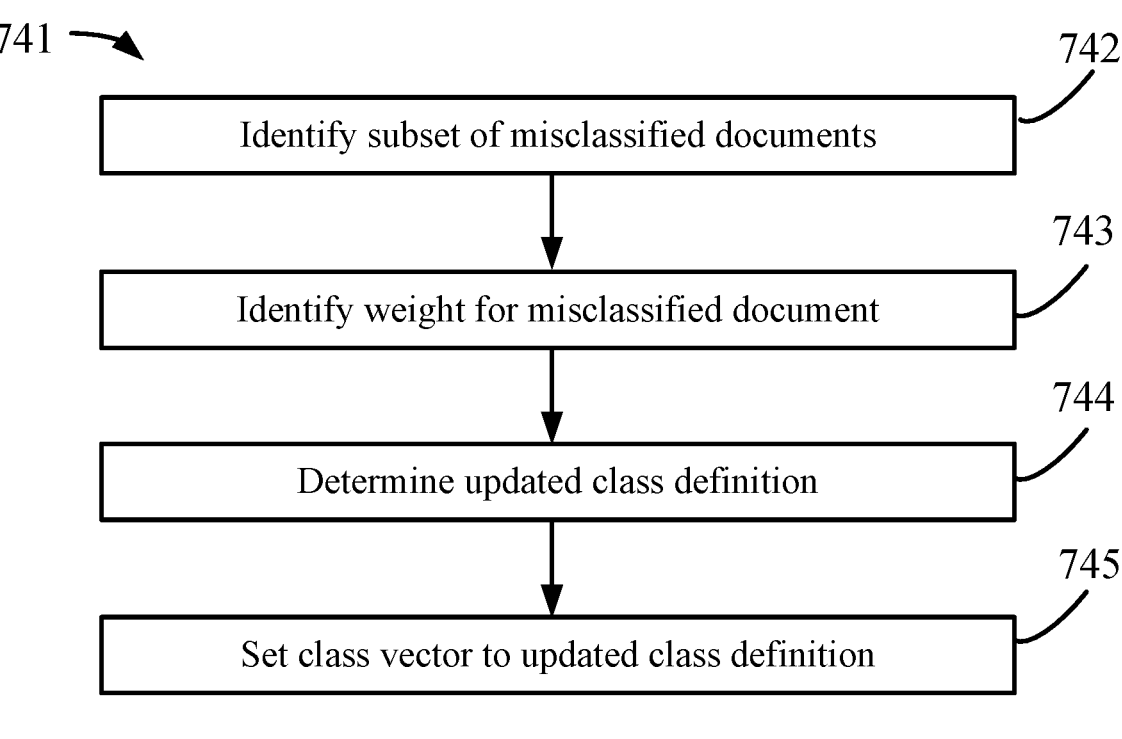

Identify subset of misclassified documents

743

Identify weight for misclassified document

744

Determine updated class definition

745

Set class vector to updated class definition

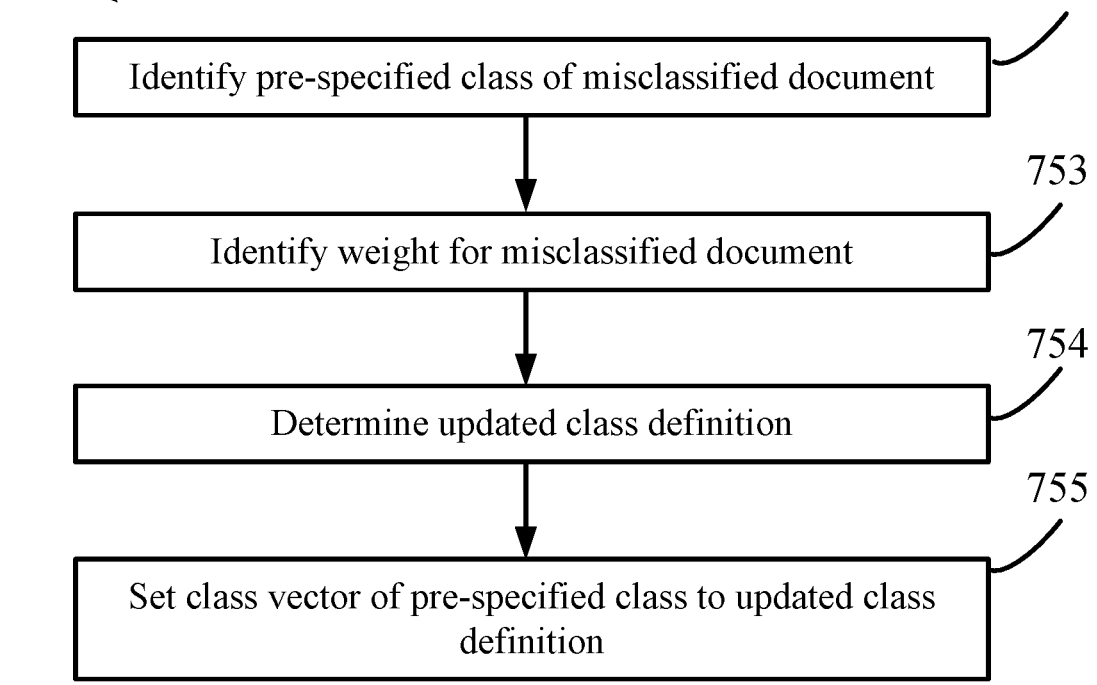

Identify pre-specified class of misclassified document

753

Identify weight for misclassified document

754

Determine updated class definition

755

Set class vector of pre-specified class to updated class definition

Fig. 7C

DEEP LEARNING SYSTEMS AND METHODS TO DISAMBIGUATE FALSE POSITIVES IN NATURAL LANGUAGE PROCESSING ANALYTICS

RELATED APPLICATIONS

This application is a Continuation-In-Part of U.S. patent application Ser. No. 17/694,243, filed Mar. 14, 2022 and titled "Deep Learning Systems and Methods to Disambiguate False Positives in Natural Language Processing Analytics," and naming Oleksandr Iakovenko, William Kelly, and Stephen Land Stewart as inventors.

The disclosure of each of the foregoing are incorporated herein by reference, in its entirety.

TECHNICAL FIELD

The present disclosure relates to analyzing documents, and, more particularly, to categorizing documents.

BACKGROUND ART

Automatically classifying documents using natural language processing is difficult for computers, and is particularly difficult when the documents are similar to one another but belong to distinct classes. For example, while a human might be readily able to distinguish a non-disclosure agreement from a non-compete agreement, and thereby classify each document of a plurality of documents into a non-disclosure agreement class or a non-compete agreement class, accurately distinguishing a non-disclosure agreement from a non-compete agreement is difficult for conventional automated and computer-implemented methods and systems. That is because a non-disclosure agreement is very similar to a non-compete agreement in that those agreements use a substantial amount of similar or identical terminology. For example, some documents provided for classification may have 90% of their wording in common, so that definition and categorization of the documents depends on the remaining 10% of the wording of the documents.

A significant problem with conventional approaches to categorizing documents using natural language processing is lack of accuracy.

One conventional approach to automatically categorizing documents involves training a neural network to recognize and classify documents. This approach may be referred-to as a "downstream classifier model." Conventionally, such a neural network may be trained using a training set of documents, where each document has an associated document vector produced based on the wording of the document, and a document to be categorized has a corresponding document vector.

For example, one neural network may be trained to recognize non-disclosure agreements, and another neural network may be trained to recognize non-compete agreements. Ideally, each such neural network can assess a document that it had not previously assessed, and which document was not part of its training set, and determine whether that document falls within the category associated with the neural network.

Neural network approaches have one or more shortcomings, however.

One shortcoming is that trained neural networks have an unacceptably high failure rate in categorizing documents where a document is similar to more than one document type (e.g., a non-disclosure agreement is similar to a non-compete agreement, whereas a non-disclosure agreement is not as similar to a document defining terms and conditions of a commercial sales transaction; and is even less similar to a restaurant menu).

Moreover, when classification accuracy is low, it is difficult or impossible to analyze what causes the low classification accuracy and how to fix it.

Another shortcoming is that neural network-based approaches require a dedicated neural network trained to recognize each class of document. If a new class of document is presented for categorization, a corresponding neural network must be trained to assess that class of document, with significant effort, time delay, and cost. Also, when it is necessary to add a new class (or to remove an existing one) from a classification class set, there is no way other than to train another neural network, and even then, it is difficult or impossible to predict the accuracy of such a new neural network, and/or the impact of such a new neural network on the accuracy of classification of pre-existing neural networks.

Another conventional approach to automatically categorizing documents is described in an article titled "Text Analysis 101: Document Classification," by Parsa Ghaffari, published by KDnuggets. That article explains that its approach to document classification "is an example of Machine Learning (ML) in the form of Natural Language Processing (NLP). By classifying text, we are aiming to assign one or more classes or categories to a document, making it easier to manage and sort." That approach suffers from lack of accuracy, however, particularly where the word vector for one class is similar to a word vector defining a different class.

Summary of Various Embodiments

In accordance with an illustrative embodiment, a method of training a natural language processing-based classification system includes providing a set of document classes, each of which has a corresponding unique class vector, and a test set of documents, in which each test document of the test set has a corresponding unique embedding vector and a pre-specified class (or "actual" class) from among the set of document classes.

The method includes operating the natural language processing-based classification system to classify each document of the test set (i.e., to assign each test document to a one of the document classes from the set of document classes). The document class to which a test document is classified in this way may be referred-to as that document's "resulting class."

In practice, the resulting class of some of the test documents will be the same as that document's pre-specified class. Those documents are properly classified.

However, in practice the resulting class of some of the test documents are not the same as that document's pre-specified class. Those documents are misclassified documents.

Illustrative embodiments select a subset of misclassified documents (e.g., the misclassified documents having the highest error depths) and adds those selected documents to class definitions to improve accuracy.

For example, each selected misclassified document is added to class definitions twice:

1. With positive weight to the correct class (i.e., the misclassified document's pre-specified class) to move correct class center \*\*towards\*\* the misclassified document's position in vector space; and 2. With negative weight to the incorrect resulting class—to move resulting class center **away from the misclassified document's position in vector space.

The document is then removed from the testing set to produce a reduced testing set. The foregoing steps may be repeated one or more times, each time with a corresponding reduced testing set. One trained, the natural language processing-based classification system may be used to classify documents that were not part of the test set.

In a first embodiments, computer-implemented method includes:

training the natural language processing-based classification system by:

providing a plurality of pre-specified class definitions, wherein each pre-specified class definition of the plurality of pre-specified class definitions is defined by a corresponding set of pre-specified documents, and each class definition of the plurality of pre-specified class definitions is uniquely associated with a corresponding document class selected from a plurality of document classes;

providing a test set including a plurality of test documents, each test document in the test set having a pre-specified class assignment to a class selected from the plurality of document classes;

automatically classifying each document of the plurality of test documents in the test set into a class selected from a plurality of document classes, such that each class has a plurality of correctly classified test documents and a set of misclassified test documents;

for each document class of the plurality of document classes:

identifying a set of test documents from the test set that have been misclassified into said document class by the act of classifying, by:

for each test document classified into said document class by the act of classifying, comparing the document's pre-specified class assignment to the test document's resulting class, and determining which of said test documents have a resulting class different from its pre-specified class, each document having a resulting class different from its pre-specified class being a misclassified document;

identifying, from the set of misclassified documents, a corresponding subset of misclassified documents;

modifying the class definition of the class to move the class definition in semantic space away from the misclassified documents; and removing the misclassified documents from the test set to produce a reduced test set.

In some embodiments, each pre-specified class definition is defined by a class vector, said class vector being the mean of embedding vectors of its corresponding set of pre-specified documents, and each test document of the test set has a corresponding embedding vector; and automatically classifying each document of the plurality of test documents in the test set into a class selected from a plurality of document classes includes:

determining, for each document of the plurality of test documents in the test set, which class vector of the set of pre-specified class vectors is closest to the test document's embedding vector, and assigning said test document to the class corresponding to the class vector that is closest to the document's embedding vector, said class being the test document's resulting class.

In some embodiments, modifying the class definition of the class to move the class definition in semantic space away from the misclassified documents includes: setting said class vector equal to the mean of (a) positively weighted pre-specified document vectors of the class and embedding vectors of the correctly classified test documents and (b) negatively weighted misclassified document vectors, such that the class has a modified class vector.

In some embodiments, the class definition of each document class is defined pursuant to a Language Statistical Model, and modifying the class definition of the class to move the class definition in semantic space away from the misclassified documents includes updating the class definition by updating the weights of characteristic words and/or combinations used in the Language Statistical Model based on the characteristic words and/or combinations in the subset of misclassified documents.

In some embodiments, the class definition of each document class is defined pursuant to a Neural Network Model, and modifying the class definition of the class to move the class definition in semantic space away from the misclassified documents includes retraining the neural networks based on the content of the misclassified documents.

In some embodiments, the class definition of each document class is defined pursuant to a Named Entity Recognition Model, and modifying the class definition of the class to move the class definition in semantic space away from the misclassified documents includes updating the class definition using named entities in the misclassified documents.

In some embodiments, the method further includes: identifying each misclassified document from the test set; and for each such identified misclassified document, identifying the misclassified document's pre-specified class assignment, to produce a set of target classes; and for each target class of the set of target classes, modifying the class definition of said target class to move the class definition in semantic space toward said misclassified document.

In some embodiments, the class definition of each document class is defined pursuant to a Language Statistical Model, and modifying the class definition of the target class to move the class definition in semantic space toward the misclassified document includes updating the class definition by updating the weights of characteristic words and/or combinations used in the Language Statistical Model based on the characteristic words and/or combinations in the subset of misclassified documents.

In some embodiments, the class definition of each document class is defined pursuant to a Neural Network Model, and modifying the class definition of the class to move the class definition in semantic space toward the misclassified document includes retraining the neural networks based on the content of the misclassified documents.

In some embodiments, the class definition of each document class is defined pursuant to a Named Entity Recognition Model, and modifying the class definition of the class to move the class definition in semantic space toward the misclassified document includes updating the class definition using named entities in the misclassified documents.

In some embodiments, the method further includes: identifying each misclassified document from the test set; and for each such identified misclassified document, identifying the class vector corresponding to said misclassified document's pre-specified class assignment, to produce a set of target class vectors; and for each target class vector of the set of target class vectors, moving said target vector in semantic space closer to the embedding vectors of each test document that (i) has said class as its pre-specified class and that (ii)

is also a misclassified document, by: updating said target class vector as the mean of (a) its set of pre-specified document vectors and (b) embedding vectors of each test document that (i) has said class as its pre-specified class and that (ii) is also a misclassified document.

In some embodiments, the method further includes: subsequent to producing the reduced test set: classifying each document of the plurality of test documents in the reduced test set into a class selected from a plurality of document classes, such that each class has a new plurality of correctly classified test documents and a new set of misclassified test documents; and subsequently for each document class of the plurality of document classes:

identifying a corresponding subset of misclassified documents;

modifying the class definition of the class using (a) positively weighted correctly classified test documents and (b) negatively weighted misclassified test documents; and removing the new set of misclassified documents from the reduced test set to produce a further reduced test set.

In some embodiments, each pre-specified class definition is defined by a class vector based on its corresponding set of pre-specified documents, and each document of the test set has a corresponding embedding vector; the method further including, subsequent to producing the reduced test set: classifying each document of the plurality of test documents in the reduced test set into a class selected from a plurality of document classes, such that each class has a new plurality of correctly classified test documents and a new set of misclassified test documents, by: determining, for each document of the plurality of test documents in the test set, which class vector is closest to the test document's embedding vector, and assigning said test document to the class corresponding to the class vector that is closest to the document's embedding vector, said class being the test document's resulting class; and subsequently for each document class of the plurality of document classes: identifying a set of test documents from the reduced test set that have been misclassified into said document class by the act of classifying, by: for each test document classified into said document class by the act of classifying, comparing the document's pre-specified class assignment to the test document's resulting class, and determining which of said test documents have a resulting class different from its pre-specified class, each document having a resulting class different from its pre-specified class being a misclassified document; identifying, from the set of misclassified documents, a corresponding subset of misclassified document vectors; modifying the class vector of the class by setting said class vector equal to the mean of (a) positively weighted pre-specified document vectors of the class and embedding vectors of the correctly classified test documents and (b) negatively weighted misclassified document vectors; and removing the misclassified documents from the reduced test set to produce a further reduced test set.

Yet another embodiment includes a system, the system including: a computer processor coupled to a set of non-transitory computer memories, the non-transitory computer memories storing computer-executable instructions that, when executed by the computer processor, cause the computer processor perform a process including:

training the natural language processing-based classification system by:

providing a plurality of pre-specified class definitions, wherein each pre-specified class definition of the plurality of pre-specified class definitions is defined by a corresponding set of pre-specified documents, and each class definition of the plurality of pre-specified class definitions is uniquely associated with a corresponding document class selected from a plurality of document classes;

providing a test set including a plurality of test documents, each test document in the test set having a pre-specified class assignment to a class selected from the plurality of document classes;

automatically classifying each document of the plurality of test documents in the test set into a class selected from a plurality of document classes, such that each class has a plurality of correctly classified test documents and a set of misclassified test documents;

for each document class of the plurality of document classes:

identifying a set of test documents from the test set that have been misclassified into said document class by the act of classifying, by:

for each test document classified into said document class by the act of classifying, comparing the document's pre-specified class assignment to the test document's resulting class, and determining which of said test documents have a resulting class different from its pre-specified class, each document having a resulting class different from its pre-specified class being a misclassified document;

identifying, from the set of misclassified documents, a corresponding subset of misclassified documents;

modifying the class definition of the class to move the class definition in semantic space away from the misclassified documents; and removing the misclassified documents from the test set to produce a reduced test set.

In some embodiments, each pre-specified class definition is defined by a class vector, said class vector being the mean of embedding vectors of its corresponding set of pre-specified documents, and each test document of the test set has a corresponding embedding vector; and automatically classifying each document of the plurality of test documents in the test set into a class selected from a plurality of document classes includes:

determining, for each document of the plurality of test documents in the test set, which class vector of the set of pre-specified class vectors is closest to the test document's embedding vector, and assigning said test document to the class corresponding to the class vector that is closest to the document's embedding vector, said class being the test document's resulting class, and the process further including:

setting said class vector equal to the mean of (a) positively weighted pre-specified document vectors of the class and embedding vectors of the correctly classified test documents and (b) negatively weighted misclassified document vectors, such that the class has a modified class vector.

In some embodiments, the process further includes: identifying each misclassified document from the test set; and for each such identified misclassified document, identifying the misclassified document's pre-specified class assignment, to produce a set of target classes; and for each target class of the set of target classes, modifying the class definition of said target class to move the class definition in semantic space toward said misclassified document.

In some embodiments, the process further includes, subsequent to producing the reduced test set: classifying each document of the plurality of test documents in the reduced test set into a class selected from a plurality of document classes, such that each class has a new plurality of correctly classified test documents and a new set of misclassified test documents; and subsequently for each document class of the plurality of document classes: identifying a corresponding subset of misclassified documents; modifying the class definition of the class using (a) positively weighted correctly classified test documents and (b) negatively weighted misclassified test documents; and removing the new set of misclassified documents from the reduced test set to produce a further reduced test set.

Yet another embodiment includes a non-transitory computer readable medium storing computer-executable code, the computer-executable code including code for causing a computer to perform any of the methods described above.

In some embodiments, the code includes: code for training the natural language processing-based classification system by:

code for providing a plurality of pre-specified class definitions, wherein each pre-specified class definition of the plurality of pre-specified class definitions is defined by a corresponding set of pre-specified documents, and each class definition of the plurality of pre-specified class definitions is uniquely associated with a corresponding document class selected from a plurality of document classes;

code for providing a test set including a plurality of test documents, each test document in the test set having a pre-specified class assignment to a class selected from the plurality of document classes;

code for automatically classifying each document of the plurality of test documents in the test set into a class selected from a plurality of document classes, such that each class has a plurality of correctly classified test documents and a set of misclassified test documents;

code for, for each document class of the plurality of document classes:

identifying a set of test documents from the test set that have been misclassified into said document class by the act of classifying, by:

for each test document classified into said document class by the act of classifying, comparing the document's pre-specified class assignment to the test document's resulting class, and determining which of said test documents have a resulting class different from its pre-specified class, each document having a resulting class different from its pre-specified class being a misclassified document;

identifying, from the set of misclassified documents, a corresponding subset of misclassified documents;

code for modifying the class definition of the class to move the class definition in semantic space away from the misclassified documents; and code for removing the misclassified documents from the test set to produce a reduced test set.

In some embodiments, each pre-specified class definition is defined by a class vector, said class vector being the mean of embedding vectors of its corresponding set of pre-specified documents, and each test document of the test set has a corresponding embedding vector; and code for automatically classifying each document of the plurality of test documents in the test set into a class selected from a plurality of document classes includes:

code for determining, for each document of the plurality of test documents in the test set, which class vector of the set of pre-specified class vectors is closest to the test document's embedding vector, and code for assigning said test document to the class corresponding to the class vector that is closest to the document's embedding vector, said class being the test document's resulting class, and code for setting said class vector equal to the mean of (a) positively weighted pre-specified document vectors of the class and embedding vectors of the correctly classified test documents and (b) negatively weighted misclassified document vectors, such that the class has a modified class vector.

In some embodiments, the computer-executable code further includes: code for identifying each misclassified document from the test set; code for, for each such identified misclassified document, identifying the misclassified document's pre-specified class assignment, to produce a set of target classes; and code for, for each target class of the set of target classes, modifying the class definition of said target class to move the class definition in semantic space toward said misclassified document.

BRIEF DESCRIPTION OF THE DRAWINGS

The foregoing features of embodiments will be more readily understood by reference to the following detailed description, taken with reference to the accompanying drawings, in which:

FIG. 7B is a flowchart that illustrates an embodiment of a method of adjusting a class vector of a class into which documents have been misclassified;

FIG. 7C is a flowchart that illustrates an embodiment of a method of adjusting a class vectors of a pre-specified class of a misclassified document.

DETAILED DESCRIPTION OF ILLUSTRATIVE EMBODIMENTS

Figure 1A:
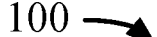
FIG. 1A schematically illustrates an embodiment of a plurality of documents to be classified into two classes.
Figure 1A:
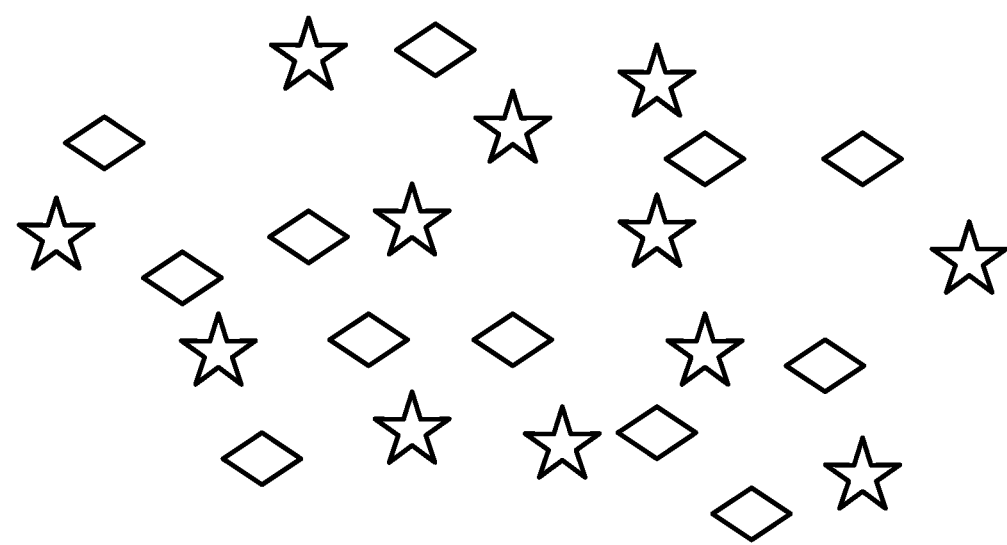

Illustrative embodiments improve the accuracy of automated methods and systems for document classification, and methods and systems for creating computer-implemented document classification systems.

Illustrative embodiments define each class of a set of document classes with a corresponding class vector (or "center vector"). Illustrative embodiments begin with an existing class vector and test the classification process or system with a test set of training documents, each such training document having a corresponding pre-assigned classification. As described in more detail herein, such embodiments improve the corresponding method or system by analyzing misclassified documents, and revising the existing class vector to produce a revised class vector based on analysis of misclassified documents. Some embodiments produce a revised class vector by applying an adjustment vector to the class vector of the document class. A revised class vector produced as a result of the application of such a process may be referred-to as a "resulting vector."

Definitions: As used in this description and the accompanying claims, the following terms shall have the meanings indicated, unless the context otherwise requires.

A "class" means a category into which one or more documents may be classified. In illustrative embodiments, a document having an embedding vector is assigned to a given class if the document's embedding vector correlates to the class vector of the given class more closely that it correlates to the class vector of any other available class. In illustrative embodiments, each document is assigned exclusively to a single class.

A "document" for purposes of document classification includes documents having data that is in text format (i.e., a document having text data, such as a contract, book, memorandum, etc.), and in some embodiments includes documents may be documents such as images (e.g., jpeg; gif.) and/or video (e.g., mpeg).

A "set" includes at least one member.

A "subset" of a set having a plurality of members is a set in which the members are fewer than the plurality of members of the set. In illustrative embodiments, with regard to a set of test documents having a plurality of test documents, each test document of a subset of the set of test documents is also a member of the test set (i.e., is a one of the plurality of test documents in the test set).

An "embedding vector" (or "document vector") is a vector that is associated with, and describes, the content of a document. An embedding vector may be produced from the content of a text document, a musical score, and/or a digital image, to name but a few examples.

For example, an embedding vector for a given text document may be produced from an analysis of the words of the text in that given document. For example, but without limiting the generality of the definition, an embedding vector for a text document may be obtained by analyzing the document with models including "doc2vec," GloVe, and "BERT," to name but a few examples. In illustrative embodiments, the embedding vector for each document in a set of documents to be classified is the same length as the embedding vector for each other document in the set of documents to be classified. In some embodiments, the embedding vector for each document in a set of documents to be classified is a unit vector.

As other examples, an embedding vector for a given musical score may be produced from an analysis of the musical notes written in that given document, and an embedding vector for a given image document may be produced from an analysis of the pixel colors and/or pixel intensity of pixels in that image document.

A "class vector" (or "center vector") is a vector that is associated with, and uniquely describes, a class of documents. For example, the class may be a class of documents into which one or more documents may be classified. In illustrative embodiments, a document having an embedding vector is classified into a given class when the document's embedding vector is geometrically closer to the class vector for the given class than it is to the respective class vector of any other available class. In some embodiments, the closeness (or geometric proximity) of two vectors may be evaluated by determining the cosine similarity of the two vectors. In some embodiments, the class vector of a given class is the mean of the embedding vectors of all documents in that class.

A plurality of class vectors may also define a "vector space."

A "mean vector" of a plurality of documents, where each document of the plurality of documents has an associated embedding vector, is a vector having the value of the mathematical mean of each of those embedding vectors corresponding to the plurality of documents.

A "vector" is a set of a plurality of individual elements. In illustrative embodiments, a "vector" takes the form of a tuple, as known in the field of mathematics [e.g., a finite ordered list (or sequence) of elements], wherein the elements of the vector are numbers. Vectors may be subject to vector operations. One example of a vector operation is (i) Proximity between a pair of vectors. The procedure accepts a pair of vectors, and returns a number—the measure of similarity between vectors. Cosine similarity is used in illustrative embodiments. Documents that are close to each other get cosine similarity values close to 1. In contrast, a similarity of zero means that the documents are unrelated to one another (e.g., they most likely belong in different classes), and a similarity at or close to −1 denotes opposite documents. Another example of a vector operation is (ii) Finding mean vector in a set of vectors. The procedure accepts a set of vectors, and returns another vector the represents the mean of the inputs. Another example of a vector operation is (iii) Multiplying vector by a number. The procedure accepts vector, a number, and returns vector multiplied by this number. In most vector systems the procedure is performed element-wise. Another example of a vector operation is (iv) Vector addition. The procedure accepts two vectors, and returns a new vector which is a sum of the two inputs.

Illustrative embodiments provide improvements in one or more of the accuracy of document classification methods, the accuracy of a document classification system, methods of creating document classification methods (e.g., creating methods of classifying documents which methods are more accurate that conventional methods of classifying documents), and/or methods of creating or training document classification systems (e.g., creating or training systems that are more accurate that conventional systems for classifying documents). In illustrative embodiments, the accuracy of a document classification method, and the accuracy of a document classification system, may be quantified by evaluating the method or system by causing the method or system to classify a test set of documents (in which each document of the test set has a pre-assigned classification; the documents may be referred to a "test set" documents), and subsequently determining the number of documents in the test set that were correctly classified by the method or system relative to the number of documents in the test set that were incorrectly classified by the method or system.

For example, the accuracy of a system or method may be quantified as a ratio in which the numerator is the number of test set documents correctly classified and the denominator is the number of documents in the test set. Alternatively, the accuracy of a system or method may be quantified as a ratio in which the numerator is the number of test set documents incorrectly classified and the denominator is the total number of documents in the test set. Alternatively, the accuracy of a system or method may be quantified as a ratio in which the numerator is the number of test set documents correctly classified and the denominator is the total number of test set documents incorrectly classified. Alternatively, the accuracy of a system or method may be quantified as a ratio in which the numerator is the number of test set documents incorrectly classified and the denominator is the number of test set documents correctly classified.

For purposes of such accuracy quantification, a system or method is deemed to have correctly classified a document of a test set (and the document is deemed to have been correctly classified by the method or system) when the classification produced by the method or system matches that document's pre-assigned classification. A system or method is deemed to have incorrectly classified a document of the test set (and the document is deemed to have been incorrectly classified or "misclassified" by the method or system) when the classification produced by the method or system does not match that document's pre-assigned classification. A test set document's pre-assigned classification may, in illustrative embodiments, by specified (or assigned) by a human document reviewer (or human "assessor") by assessing the document and classifying the document (i.e., assigning the document's pre-assigned classification) pursuant to that assessment. In illustrative embodiments, a test set document's pre-assigned classification is specified (or assigned) before that test document is classified as part of a method of training a document classification system. Moreover, in illustrative embodiments, a test set document's pre-assigned classification is specified (or assigned) before execution of code for classifying that test document, for example as part of a test set used in training a document classification system FIG. 1A schematically illustrates an embodiment of a plurality of documents 100 to be classified into two classes. Documents of the first class are schematically illustrated as stars, and documents of the second class are schematically illustrated as diamonds.

Figure 1B:
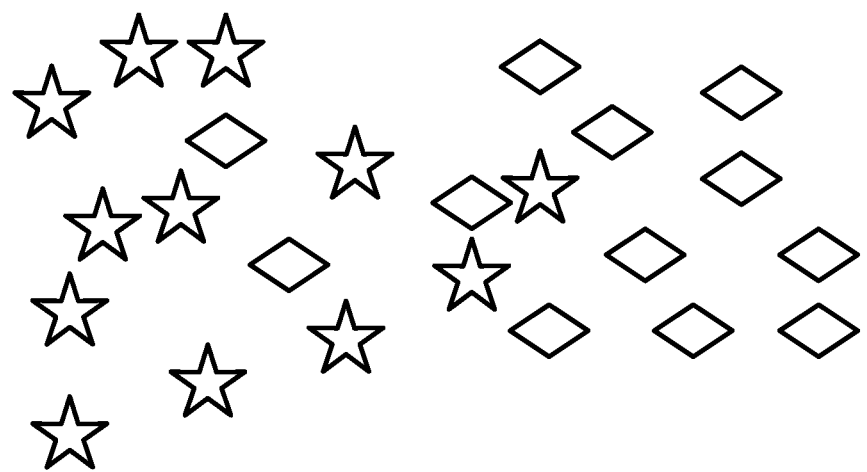
FIG. 1B schematically illustrates the plurality of documents classified into two classes pursuant to prior art methods.

The documents are displayed in a two-dimensional space. FIG. 1B schematically illustrates the plurality of documents 100 classified into the two classes pursuant to a prior art method, or by a system implementing such a prior art method. Ideally, when the documents are all correctly classified, the documents would, in this visual illustration, appear to be segregated into two distinct groups, in which no document of the first class would appear within the group of documents of the second class, and no document of the second class would appear within the group of documents of the first class. In other words, no star would be within the group of diamonds, and no diamond would be within the group of stars. As schematically illustrated in FIG. 1B, however, some stars are within the group of diamonds, and some diamonds are within the group of stars. Consequently, the prior art method or system that classified the documents exhibits some inaccuracy.

Figure 1C:
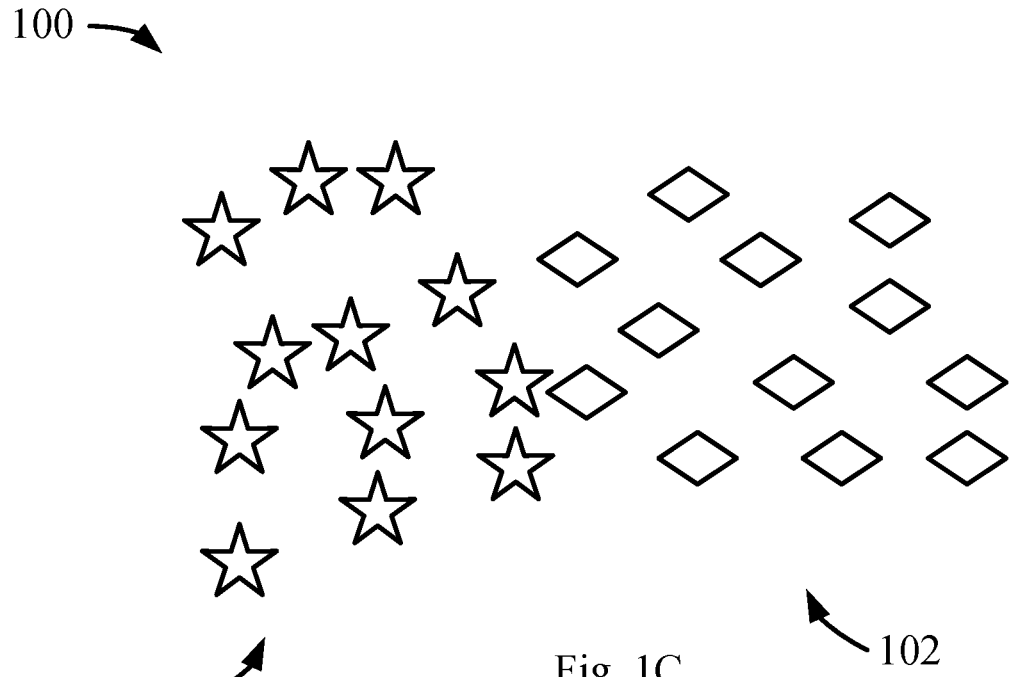
FIG. 1C schematically illustrates the plurality of documents classified into two classes pursuant to illustrative embodiments.

FIG. 1C schematically illustrates the plurality of documents 100 classified into two classes pursuant to illustrative embodiments. In contrast to FIG. 1B, in FIG. 1C, the first group 101 includes only documents of the first class (the stars) and the second group 102 includes only documents of the second class (the diamonds). The classification represented by FIG. 1C is an improvement of the accuracy of the classification represented by FIG. 1B, and the method and/or system used to produce the classification represented by FIG. 1C is (and exhibits) an improvement relative to the method and/or system used to produce the classification represented by FIG. 1B. That improvement is attributable to embodiments of methods and systems disclosed herein.

Figure 2:
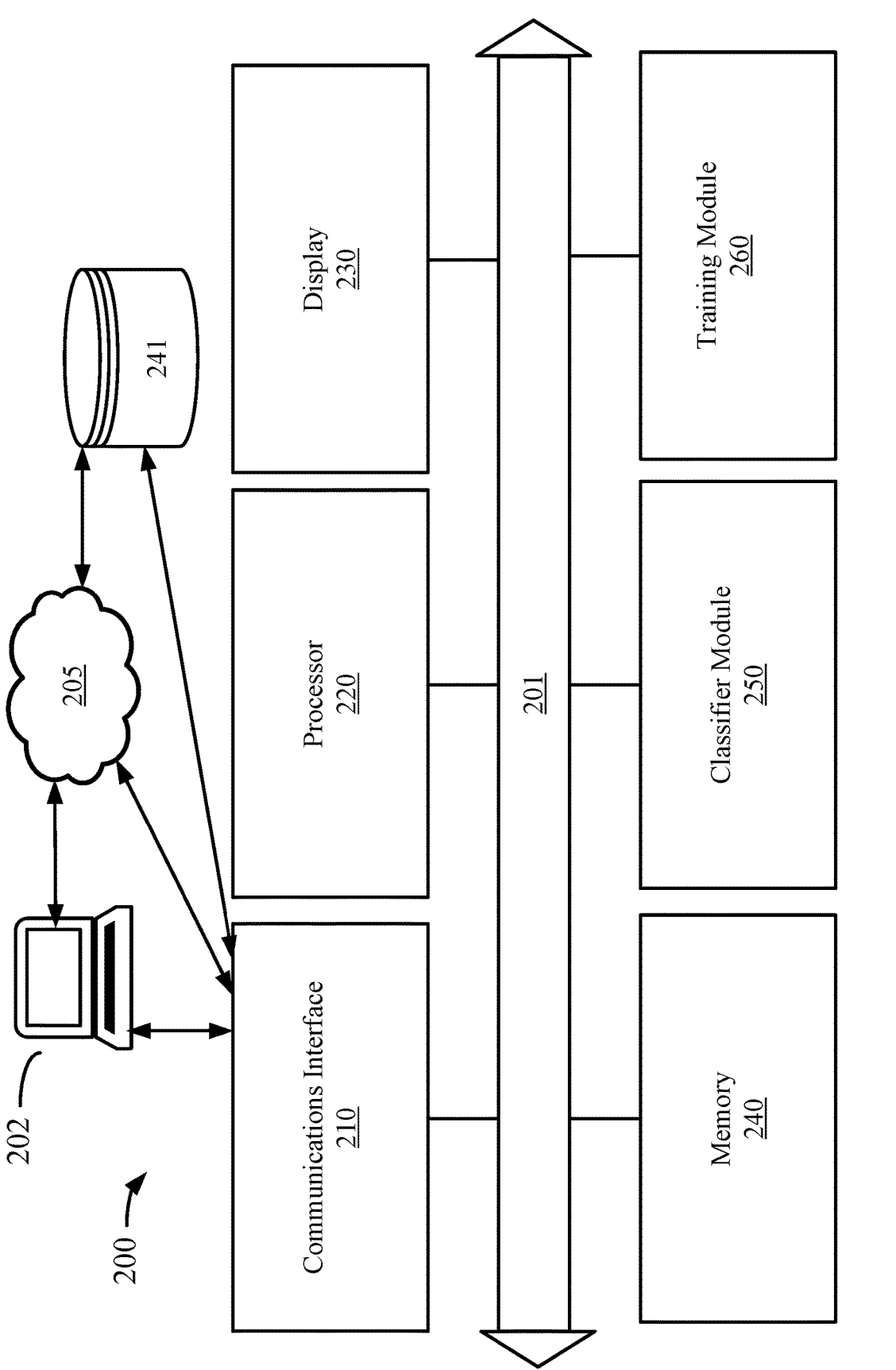
FIG. 2 schematically illustrates a system according to an illustrative embodiment.

FIG. 2 schematically illustrates a system 200 according to an illustrative embodiment. The system 200 includes a communications interface 210 configured for electronic (e.g., digital) communication with one or more other electronic devices. For example, such other devices may include another computer 202, and/or servers in the cloud and/or a remote database 241. Such communication may take place over a network 205, such as a local area network, a wide area network, or the Internet.

The system 200 also includes computer processor hardware 220, including for example a microprocessor system available from Intel or Advanced Micro Devices.

The system 200 also includes a display (e.g., a computer monitor) configured to display system output to a system user. In some embodiments, the display 230 (e.g., a touch-screen display) may also receive input from the system user.

The system 200 also includes a memory 240. The memory may be computer random access memory (RAM) and/or read-only memory (ROM), as those terms are known in the computer art. The memory 240 may be volatile or non-volatile, as those terms are known in the computer art. The memory 240 may configured to store, among other things, executable computer instructions that, when executed by the processor hardware 220, cause the system 200 to perform one or more steps of methods described herein; documents to be classified, class vectors, test sets of documents, and other information or data as described herein.

The system 200 also includes a classifier 250 configured to classify each document of a plurality of documents into a corresponding class selected from a plurality of classes. In illustrative embodiments, the classifier 250 configured to uniquely classify each document of a plurality of documents into a corresponding class selected from a plurality of classes. The classifier 250 may be configured by providing to the classifier module executable computer code configured to implement one or more steps of methods as described herein.

The system 200 also includes a trainer 260 configured to train a document classifier 260. The trainer 260 may be configured to train a classifier 250 by providing to the trainer 260 executable computer code configured to implement one or more steps of methods as described herein.

Figure 3:
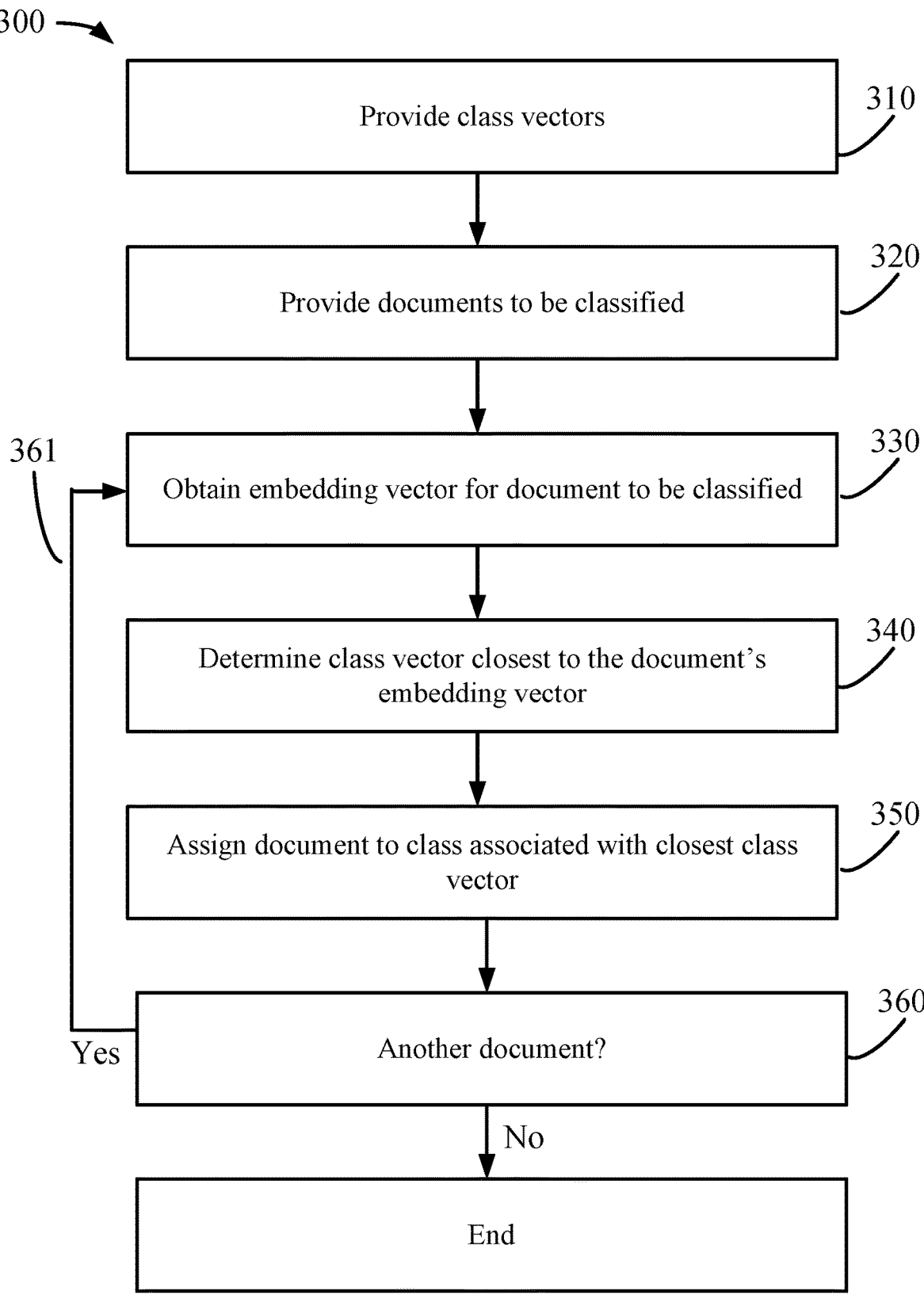
FIG. 3 is a flowchart that illustrates a method of classifying documents according to an illustrative embodiment.

FIG. 3 is a flowchart that illustrates a method 300 of classifying documents into a set of established classes according to an illustrative embodiment.

Step 310 includes providing a set of class vectors (which may be referred-to as "pre-specified" class vectors). Each class vector of the set of class vectors corresponds uniquely to a one of the classes of the set of established classes. One or more of the class vectors of the set of class vectors may be produced pursuant to an embodiment of a method described herein.

Step 320 includes providing a set of documents to be classified. Unless the documents to be classified are a test set of documents in which each document has pre-assigned classification, the documents to be classified do not have a known or pre-assigned or a priori classification.

Steps 330-350 are performed for each document in the set of documents to be classified, and may be performed repeatedly, as in a loop (e.g., step 351).

Step 330 includes obtaining, for each document to be classified, its embedding vector (which may be referred-to as its "corresponding" embedding vector). Collectively, a plurality of documents to be classified have a corresponding plurality of embedding vectors, where each embedding vector corresponds uniquely to a corresponding one of the documents in the set of documents. Such an embedding vector may be thought of as a signature of the corresponding one of the documents in the set of documents. When a document from the set of documents already has a corresponding embedding vector, obtaining an embedding vector corresponding to said document may be performed by retrieving that embedding vector, for example from a computer memory or database. If the document from the set of documents does not already have a corresponding embedding vector, obtaining an embedding vector corresponding to said document may be created by analyzing the document with models including "doc3vec," GloVe, and "BERT," to name but a few examples. In some embodiments, an embedding vector created by analyzing the document may be stored, such as in a computer memory or database, to name but a few examples.

Step 340 includes determining, for each document of the set of documents, the class vector, from the set of class vectors (see step 310), that is closest to said document's embedding vector. In illustrative embodiments, the document's embedding vector is compared to each of the class vectors by calculating the cosine similarity between the document's embedding vector and each of the class vectors. The class vector having the greatest cosine similarity to the document's embedding vector is the class vector that is closest said document's embedding vector.

In other words, determining, for each document of the set of documents, the class vector, from the set of class vectors (see step 310), that is closest said document's embedding vector includes determining, for each class vector of the set of pre-specified class vectors, its cosine similarity to the document's embedding vector, to produce a plurality of cosine similarity values; and selecting, as the pre-specified class vector closest to the document's embedding vector, the pre-specified class vector having the greatest cosine similarity value from the plurality of cosine similarity values.

Step 350 includes assigning each document of the set of documents to the class having the class vector that is closest said document's embedding vector.

Step 360 assess whether there is at least one additional document, from the set of documents, to be classified. If so ("Yes"), the method 300 loops back to step 330 at step 361. Otherwise, the method 300 terminates (ends).

Steps 330, 340 and 350 may be described, for each document of the set of documents, as determining which class vector of the set of pre-specified class vectors is closest to the document's embedding vector, and assigning to said document the class corresponding to the class vector that is closest to the document's embedding vector.

Figure 4A:
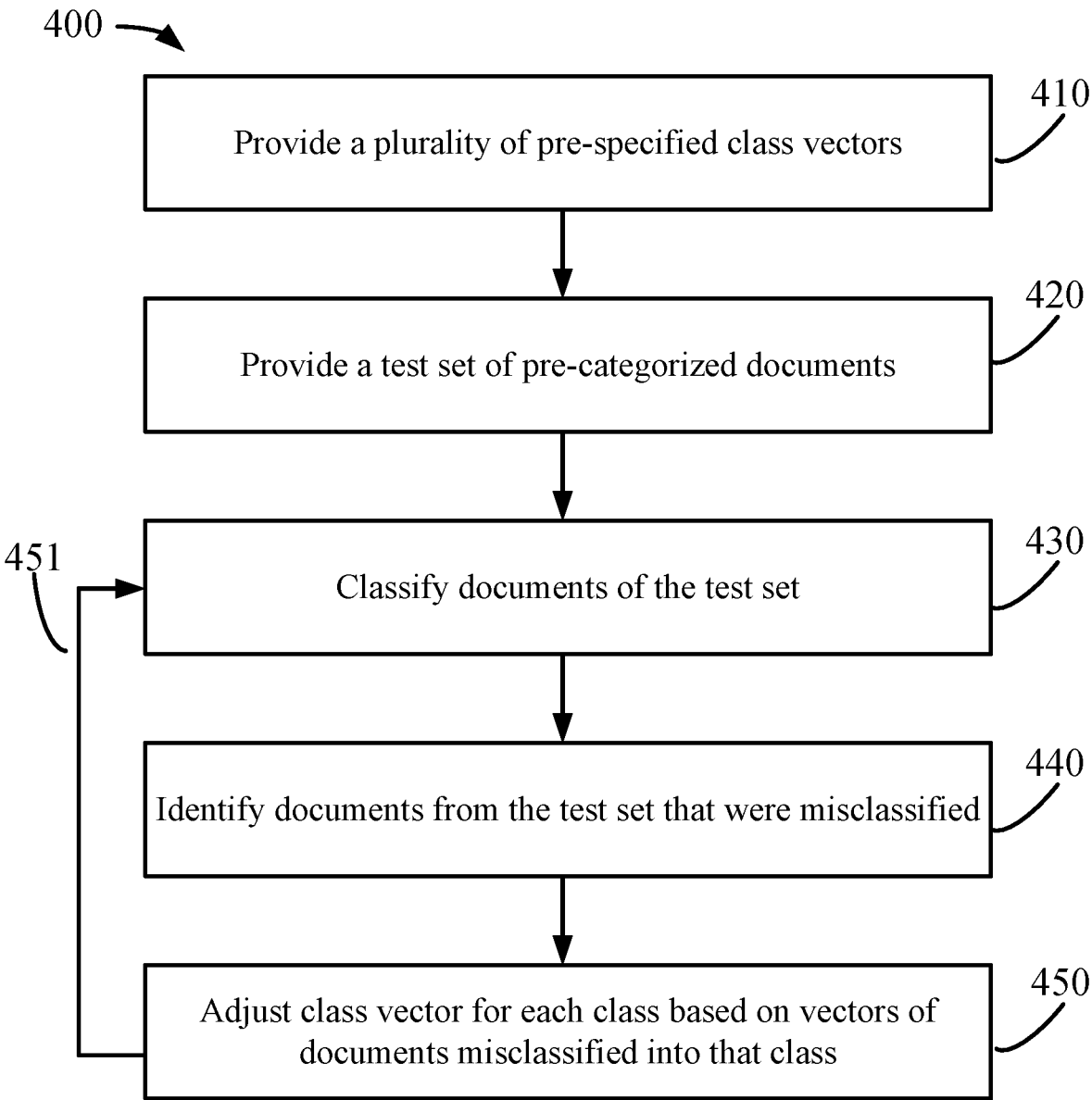
FIG. 4A is a flowchart that illustrates a method of training a document classifying system according to an illustrative embodiment.

FIG. 4A is a flowchart that illustrates a method of training a document classifying system configured to sort each document of a set of documents into a class from a set of established classes, according to an illustrative embodiment. Illustrative embodiments of a method of training a document classifying system may be described as a type of machine learning. Illustrative embodiments of a method of training a document classifying system do not train a neural network. In other words, illustrative embodiments of methods for training a natural language processing-based classification system to classify each document of a plurality of electronically-stored text documents into a class selected from a plurality of document classes include training a document classifying system do not train a neural network. In other words, illustrative embodiments of methods for training a natural language processing-based classification system to classify each document of a plurality of electronically-stored text documents into a class selected from a plurality of document classes where the natural language processing-based classification system does not classify documents using a neural network trained to classify documents.

Step 410 includes providing a set of pre-specified class vectors. Each class vector of the set of class vectors corresponds uniquely to a one of the classes of the set of established classes. For example, a set of classes may include an integer ("N") number of classes denoted with index "i" [i=1, 2, 3, . . . N], so that each class ("C") of the set of classes may be identified as "$C_i$." Each class has an associated class vector, denoted "$P_i$." Step 410 may be described as providing a plurality of pre-specified class vectors ($P_i$), in which each class vector is associated with a corresponding document class ($C_i$) selected from the plurality of document classes.

Step 420 includes providing a test set [T] of documents. The test set includes an integer number ["J"] of documents denoted with index "j" [j=1, 2, 3, . . . J]. Each document of the test set may be identified as "$d_j$." In illustrative embodiments, the test set including at least 1500 documents. For example, with a test set of 1500 test documents, the inventors improved the accuracy of an embodiment of a document classification from system from 79.8% to 84.8% over four iterations of the adjustment process described herein.

The number of documents in the test set may be determined by an operator, however, based on the operator's experience, and/or the accuracy desired for the system, and/or the nature of the documents to be classified.

Each document in the test set [T] has a pre-assigned classification selected from the N classes, which pre-assigned classification may be referred-to as its "real" class, and identified as "$r_j$." The pre-assigned classification ("$r_j$") corresponding to each document of the test set of documents may be established or determined by a human document reviewer (or human "assessor") by assessing the document and classifying the document (i.e., assigning the document's pre-assigned classification) pursuant to that assessment.

Each class ($C_i$) includes a sub-set of the documents of the test set [T], the sub-set including an integer number ("S") of documents denoted with index "s" such that each document in a subset may be identified as "$d_s$." Each document in the test set has a corresponding embedding vector $E_s$.

Each document in the test set that is pre-assigned to a class may be identified using both its class index ("i") and its document index ("s"), as "$D_{is}$."

For example, consider a test set [T] having nine documents, $d_1$ (having embedding vector $E_1$), $d_2$ (having embedding vector $E_2$), $d_3$ (having embedding vector $E_3$), $d_4$ (having embedding vector $E_4$), $d_5$ (having embedding vector $E_5$), $d_6$ (having embedding vector $E_6$), $d_7$ (having embedding vector $E_7$), $d_8$ (having embedding vector $E_8$), and $d_9$ (having embedding vector $E_9$). The documents of the test set fall exclusively into one of three classes (i=1, 2, and 3): $C_1$, $C_2$ and $C_3$, having class vectors $P_1$, $P_2$ and $P_3$, respectively. For example, consider that documents $d_1$, $d_4$ and $d_7$ fall into class C1 (and therefore have pre-assigned classification $r_1$, and may be referred-to as documents $D_{11}$, $D_{14}$ and $D_{17}$, respectively), documents $d_2$, $d_5$ and $d_8$ fall into class C2 (and therefore have pre-assigned classification $r_2$, and may be referred-to as documents $D_{22}$, $D_{25}$ and $D_{28}$, respectively), and documents $d_3$, $d_6$ and $d_9$ fall into class C3 (and therefore have pre-assigned classification $r_3$, and may be referred-to as documents $D_{33}$, $D_{36}$ and $D_{39}$, respectively).

Step 430 includes automatically classifying each document of the test set of documents pursuant to its corresponding embedding vector. The class assigned to a document from the test set by such automatic classification may be referred-to as its model-defined class, and denoted "$m_i$."

In illustrative embodiments, automatically classifying each document of the test set of documents includes determining, for each document of the test set of documents, the class vector, from the set of pre-specified class vectors (see step 310), that is closest said document's embedding vector. In illustrative embodiments, the document's embedding vector is compared to each of the class vectors by calculating the cosine similarity between the document's embedding vector and each of the class vectors. The class vector having the greatest cosine similarity to the document's embedding vector is the class vector that is closest said document's embedding vector. Consequently, in some embodiments, step 430 includes automatically classifying each document in the plurality of documents of the test set into a one of the classes of the plurality of classes by assigning to each such document an assigned class, the assigned class being a class having a class vector closest to the document's embedding vector.

After step 430, each document from the test set may be referred-to as a "classified" document, and the documents of the test set of documents may be referred-to collectively as the "classified documents" or the "set of classified documents."

Step 440 includes identifying, from the set of classified documents, which of the classified documents have been misclassified. Documents have been misclassified at step 430 may be referred-to as "False Positives." Conversely documents that have been properly classified at step 430 may be referred-to as "True Positives."

The process of identifying such misclassified documents may be performed automatically, by a computer, by comparing the pre-assigned classification ("$r_j$") of each document of the test set to the class vector of the class into which it was classified at step 430. A document is misclassified if its model-defined class ("$m_i$") does not match (i.e., is not the same as) its pre-assigned classification ("$r_j$"). In other words, a document ($d_{ij}$) is misclassified (i.e., it is a False Positive) when $m_i$ is not equal to $r_i$ ($m_i \neq r_i$), and a document is correctly classified (i.e., it is a True Positive) when $m_i$ is equal to $r_i$ ($m_i = r_i$).

In an illustrative embodiment, identifying, from the set of classified documents, which of the classified documents have been misclassified, assesses each class individually. For example, identifying for each class which of its classified documents have been misclassified includes: for each document in said document class, comparing the document's pre-specified class assignment to the document's assigned class, and determining which of said documents have an automatically-assigned class different from its pre-specified class, each document having an automatically-assigned class different from its pre-specified class being a misclassified document.

In some embodiments, step 440 includes quantitatively determining the accuracy of the of classification process of step 430, in one (or more) of the ways described herein (e.g., a ratio in which the numerator is the number of test set documents correctly classified and the denominator is the number of documents in the test set; and/or as a ratio in which the numerator is the number of test set documents incorrectly classified and the denominator is the total number of documents in the test set; and/or as a ratio in which the numerator is the number of test set documents correctly classified and the denominator is the total number of test set documents incorrectly classified; and/or as a ratio in which the numerator is the number of test set documents incorrectly classified and the denominator is the number of test set documents correctly classified), to name but a few examples.

Step 450 includes adjusting the class vector for each class based on the embedding vectors of documents misclassified into that class. If a class does not have any document misclassified into that class, then the method does not adjust the class vector of that class.

Steps 430-450 of the method 400 may be performed through one or more iterations. For example, the accuracy of the of classification process of step 430 determined at step 440 may be compared to a threshold, and steps 430-450 may be repeated (step 451) until the accuracy of the of classification process of step 430 determined at step 440 meets or exceeds that threshold. The threshold may be determined by a system operator, and may depend, for example, on the needs of the system being created or tuned, and/or the nature of the documents to be classified. The inventors have discovered that an acceptable level of accuracy may be achieved within three or four iterations, although the number of iterations may depend on the desired level of accuracy, and/or the time desired to tune the method. Generally, if an acceptable level of accuracy has not been reached within 25 iterations, the iterations should be capped at 25 and other factors (e.g., the intensity coefficient; and/or the number of documents in the test set; and/or one or more of the class vectors) should be adjusted and the process repeated.

Figures 4B, 4C:
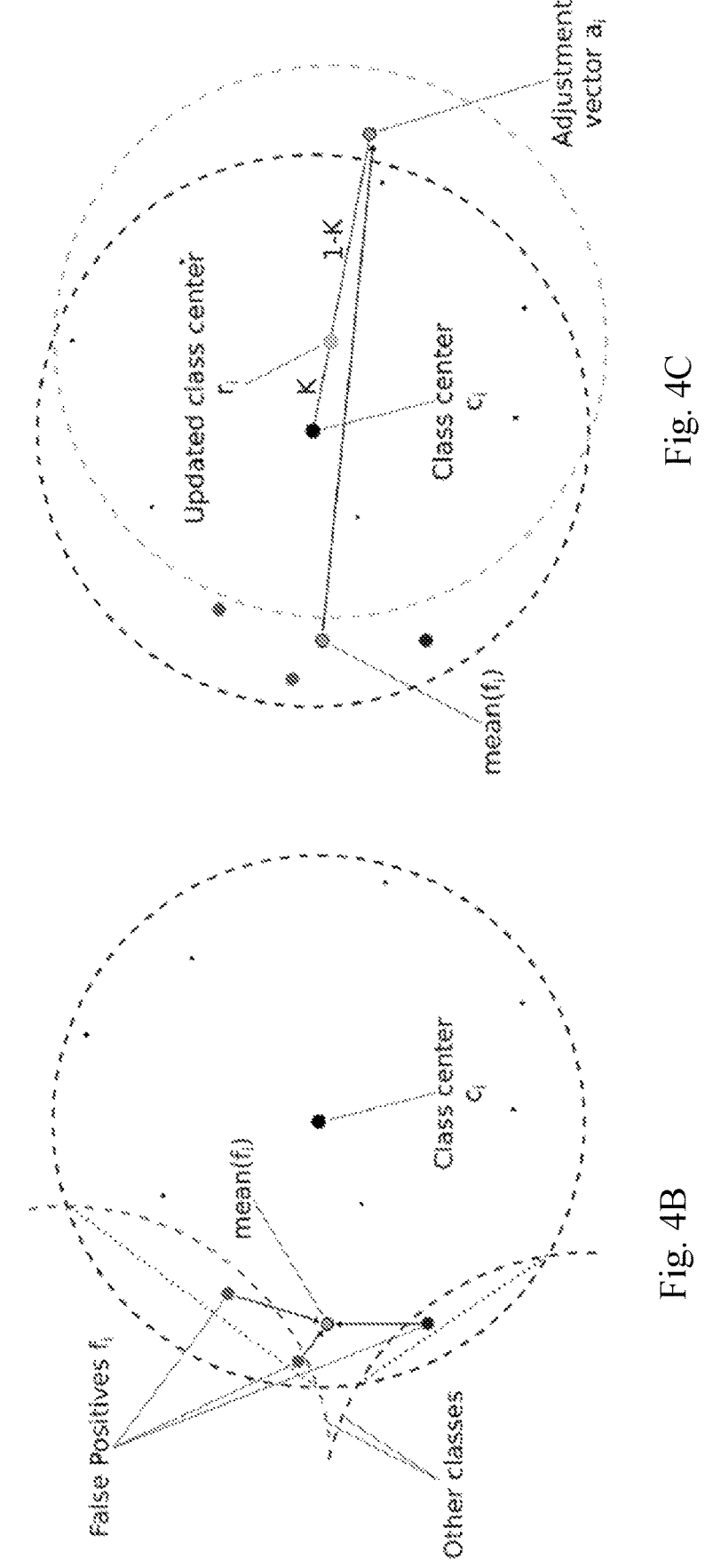
FIG. 4B and FIG. 4C schematically illustrate a class of documents before and after, respectively, adjustment of the classification system according to an embodiment.

FIG. 4B and FIG. 4C schematically illustrate a class of documents before and after, respectively, adjustment of the classification system according to an embodiment. Steps 430 and 440 are represented FIG. 4B, and step 450 is represented by FIG. 4C.

Figure 5:
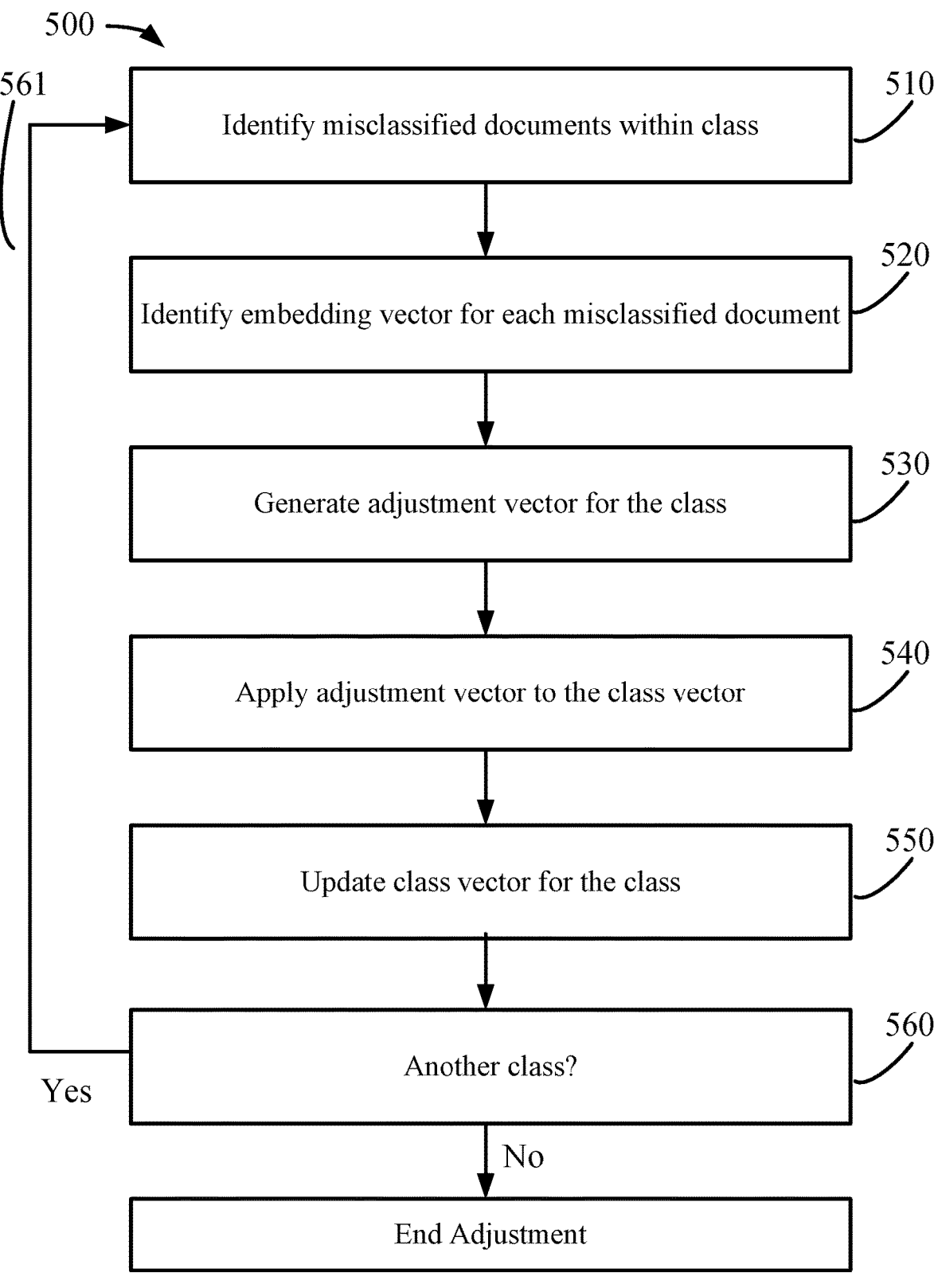
FIG. 5 is a flowchart that illustrates a method of adjusting a class vector according to an illustrative embodiment.

FIG. 5 is a flowchart that illustrates a method 500 of adjusting a class vector for a given class. This method may be performed at step 450, above.

Step 510 includes identifying misclassified documents (i.e., "False Positives") within the class.

Step 520 includes identifying, for each such misclassified document, the misclassified document's embedding vector, to produce a set ("F") of misclassified document vectors, the set including the embedding vectors, respectively, of the misclassified documents.

Step 530 includes generating an adjustment vector ($A_i$) corresponding to the class. In an illustrative embodiment, generating an adjustment vector ($A_i$) corresponding to a class ($C_i$) includes identifying the document vectors for the documents misclassified into that class (i.e., the document vectors for the False Positives within that class), which form a set ($F_i$) of misclassified document vectors, and determining the mean [mean (Fi)] of those document vectors in the set ("$F_i$") of misclassified document vectors, the adjustment vector ($A_i$) being the negative of the mean of the misclassified document vectors in the set ("$F_i$") [$A_i = -1 * \text{mean}(F_i)$].

Step 540 includes applying the adjustment vector ($A_i$) to the class vector ($P_i$).

In an illustrative embodiment, applying the adjustment vector ($A_i$) to the class vector ($P_i$) includes moving the class vector ($P_i$) of the document class [$C_i$] with the adjustment vector to produce a resulting vector [$PR_i$], using the following equation:

$$PR_i = K * A_i + (1-K) * P_i;$$

where "K" is an intensity coefficient. In illustrative embodiments, K has a value between 0 and 1. In preferred embodiments, the intensity coefficient (K) is not equal to 1, since K=1 may undesirably produce a resulting vector that reduces the accuracy of the method or system. In other embodiments, the intensity coefficient (K) may be selected from any of K=0.9, K=0.8, K=0.7, K=0.6, K=0.5, K=0.4, K=0.3, K=0.2, and K=0.1, to name but a few examples. The inventors have discovered that an appropriate value for the intensity factor K often lies in a range between 0.2 and 0.3. The value of K may be set and/or adjusted by a system operator, for example, based on the system operator's experience, and/or the speed (or number of iterations) desired to perform the adjustment, to name but a few examples.

Step 550 includes setting the class vector $[P_i]$ of the document class $[C_i]$ equal to the resulting vector $[PR_i]$ to produce an updated class vector.

Some embodiments may be described with the following steps:

1. Take all document embedding vectors from the test set and for each document vector calculate proximity to all class vectors.
2. Each document is consequently assigned a model-defined class—the class with maximum proximity of the classes class vector to the document's embedding vector.
3. For each class (in turn, each class is the "current" class), the documents with model-defined class equal to real annotated class are True Positives, and the documents that have model-defined class not equal to its real class are False Positives for the class. The False Positive documents may the thought-of as documents that are mistakenly picked by an i-th class model. To counter this effect, illustrative embodiments move the class vector of that class away from the embedding vectors of the False Positive documents.
4. Find set of vectors for all False Positive documents of current class.
5. Find an adjustment vector for the current class: $A_i = -1*\text{mean}(F_i)$
6. Apply adjustment vector $A_i$ to current class's vector $P_i$. The resulting revised class vector $(PR_i)$ is calculated as described above.
7. Update class vector for the current class: Set $P_i = PR_i$. The class vector, after having been updated in this way, may be referred-to as an updated class vector for the class.

Figure 6:
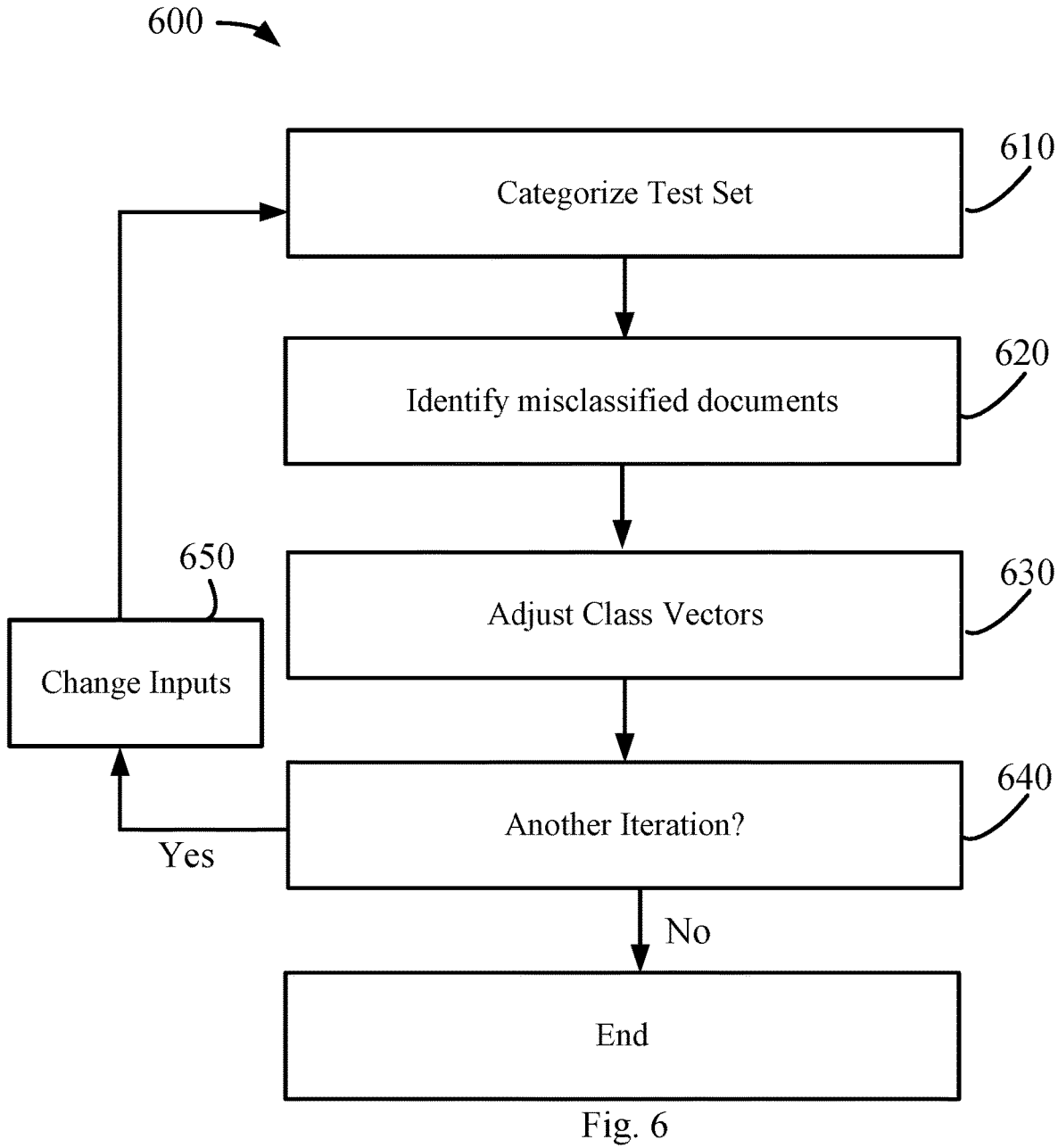
FIG. 6 is a flowchart that illustrates a method of refining a document classification system.

FIG. 6 is a flowchart that illustrates an overview of an iterative method 600 of refining a document classification system according to one embodiment (which may be referred-to as the "Auto-Tune" embodiment). Generally, the method 600 refines the document classification system by iterating a process of categorizing test documents and adjusting the class definition of each class of a plurality of classes based at least in part on documents that have been misclassified.

In some embodiments, a class is defined by a corresponding class vector, and adjusting the class definition of a class includes adjusting the class vector based, at least in part, on the respective embedding vectors of misclassified documents.

In some embodiments, a class is defined by a language statistics model (or "language statistical model") for the document class, and specifically by weighted words and word combinations that are characteristic to the particular class. This language statistics model generates proximity values between a document and classes based on word statistics in a given document. In such embodiments, model parameters include a set of weighted words/word combinations that characterize a class, and adjusting the class definition includes adjusting the set of weighted words/word combinations based, at least in part, on words and/or word combinations of misclassified documents. In illustrative embodiments, a document is assigned to a class by splitting the document into words according to tokenization rules. The document is then represented by a collection of pairs: e.g., word_or_word_combination, num_occurrences_in-_document. Each document class has a set of characteristic words/combinations with weights. A statistic score for a document and a class is the sum of weights of all characteristic words/combinations for current class found in current document. Statistic_similarity for a document and a class is defined as normalize(statistic_score(document, class), normalization_parameters), normalization is informed. A document is assigned to the class with maximum statistic_similarity to the document. In some embodiments, in which the statistical model is a part of composite model, then (for example): summary_similarity(document, class)=0.5*statistic_similarity(document, class)+0.5*cosine_similarity(document_vector, class_vector).

In some embodiments, a class is defined by a neural network or a plurality of neural networks (or similar technology such as a Random Forest) that turns a document vector to a proximity value in [0,1] range, and adjusting the class definition includes re-training the neural network or neural networks based, at least in part, on misclassified documents.

In some embodiments, a class is defined by a Named Entity Recognition (NER) approach. An NER system finds Named Entities in the text of a document, and accepts Named Entities found in the text and returns NER-based proximity. Model Parameters in a Named Entity Recognition approach include a definition of Named Entities, and also a method to turn number/density of Named Entities in the text to NER-proximity. In such embodiments, adjusting the class definition includes adjusting the Named Entity Recognition algorithm based, at least in part, on Named Entities in misclassified documents.

In illustrative embodiments, the Auto-Tune procedure uses small fraction (or other subset) of documents in a testing set (or test set) to improve classification accuracy on the entire test set. Auto-Tune evaluates classification samples and finds the subset of testing samples that are most valuable for classification accuracy improvement. The procedure then uses valuable samples to improve class definitions using advantages provided by proximity-based classification system. These advantages are accomplished by influencing document features and attributes that increase the distances within the semantic space. Simply, false positive document specific influences are diminished and the models continually re-run comparing efficacy ratings between iterations.

At step 610, the method 600 categorizes a test set of documents into a plurality of classes using the document classification system.

Each document in the test set has an embedding vector and pre-specified class (or "actual" class) to which the document belongs. Each class has a class vector. In illustrative embodiments, categorization is performed using a proximity-based approach by which, for each document, it is possible to register the proximity value between the particular document and a class based on the document's embedding vector and the class vector of the class. In illustrative embodiments, the method 600 categorizes each document to a class by comparing the document's embedding vector to the class vector of each available class. The method assigns each document to the class (which may be referred-to as the document's "resulting" class) having the class vector closest to the document's embedding vector. Proximity (i.e., the closeness) between an embedding vector and a class vector is determined by the cosine similarity between the embedding vector and the class vector.

If the resulting class for a document is the same as the document's pre-specified class, then the document is correctly classified (and may be referred-to as a "True Positive").

At step 620, the method 600 identifies each document that was misclassified by the act of categorizing at step 610. Identifying a document that has been misclassified includes comparing the document's pre-specified class assignment to the test document's resulting class, and determining which of said test documents have a resulting class different from its pre-specified class. Each document having a resulting class different from its pre-specified class being a misclassified document (which may also be referred-to as "false positive").

In vector space, when a class has a set of false positive documents, it means that the class vector for the class is too close to some set of unrelated documents. A vector-space solution is to move the class center away from error-producing documents in the vector space. This may be achieved by adding vectors of error-producing false positive documents to the class definition of the class with negative coefficients. This addition allows to add "negative" samples to class definition. In illustrative embodiments, the number of negative samples added to the class vector is fewer than a number of normal (positive) samples (i.e., documents that are not false positives) added to the class vector.

For example, for each test document of the test set, let $P_{ak}$ be the proximity between the embedding vector of the test document and the class vector of that test document's actual (i.e., pre-specified) class ($A_k$ for a test set document with index k). The proximity between the embedding vector of the test document and the class vector of that test document's actual class is defined as the cosine similarity between those two vectors.

For each test document of the test set, let $P_{rk}$ be the proximity between the embedding vector of the test document and the class vector of the class (the resulting class) ($R_k$ for a test set document with index k) to which the test document was classified by the step of classifying. The proximity between the embedding vector of the test document and the class vector of that test document's resulting class is defined as the cosine similarity between those two vectors.

For a document with index k, if the document's pre-specified class ($A_k$) is equal to that document's resulting class ($R_k$), then classification is correct for the document, and that document is not a misclassified document. For a document with index k, if the document's pre-specified class ($A_k$) is not equal to that document's resulting class ($R_k$), then the document is misclassified. Each of the test documents that is misclassified may be referred-to as a "misclassified" document.

Figure 7A:
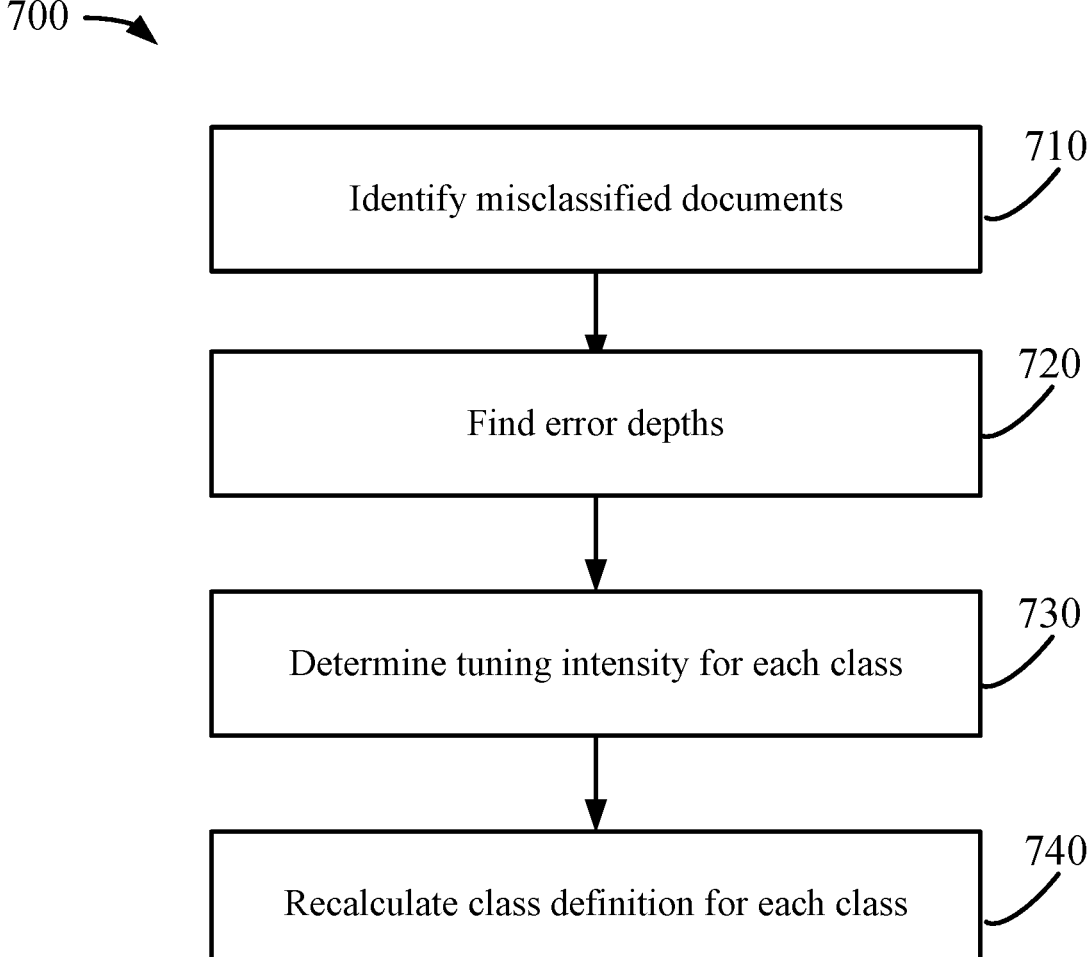
FIG. 7A is a flowchart that illustrates an embodiment of a method 600 of adjusting a class vector according to another illustrative embodiment.

At step 630, the method 600 adjusts the class definitions of each class of the plurality of classes, based on an assessment of the outcome of the categorization from step 610. FIG. 7A illustrates an embodiment of a method of adjusting the class vectors of each class of the plurality of classes, for embodiments in which a class definition is based on class vectors, based on an assessment of the outcome of the categorization from step 610.

At step 640, the method 600 determines whether to initiate another iteration. In some embodiments, methods and systems are configured to execute a pre-defined number of iterations. For example, some embodiments are configured to execute five iterations (an initial iteration, followed by four additional iterations). Some embodiments are configured to execute four iterations (an initial iteration, followed by three additional iterations). Other embodiments execute consecutive iterations as long as the Relative Error Depth (explained below) is above a low threshold. For example, some embodiments initiate an additional iteration at step 640 each time the Relative Error Depth from the immediately preceding iteration is greater than 0.0125.

If the method determines to initiate another iteration, then the method updates the inputs to the process (e.g., eliminates some documents from the test set) at step 650, and then loops back to step 610, where it categorizes the now-reduced test set of documents into the plurality of classes using the document classification system, where the class vectors have been adjusted at step 630. If the method determines not to initiate another iteration, then the method ends.

FIG. 7A is a flowchart that illustrates an embodiment of a method 700 of adjusting a class definition for a class (for example, without limitation, in an embodiment in which the class definition is defined by a class vector).

At step 710, the method identifies, for each class of the plurality of document classes, documents that have been misclassified into said class.

Step 720 includes finding the error depth of each such misclassified document. The "error depth" ($E_k$) of a misclassified document with index "k" is the difference between (i) the proximity ($P_{ak}$) between the embedding vector of the misclassified test document and the class vector of that test document's actual (i.e., pre-specified) class and (ii) the proximity (i.e., $P_{rk}$) between the embedding vector of the test document and the class vector of the resulting class to which the test document was classified by the step of classifying. In other words, the error depth ($E_k$) may be calculated as follows: $E_k = P_{ak} - P_{rk}$.

For correctly classified documents, $R_k = A_k$, and $P_{rk} = P_{ak}$, and $E_k = 0$.

For incorrectly classified documents, $E_k$ is not equal to 0.

Step 720 also includes finding the Relative Error Depth ($E_{ra}$) for each class (a). The Relative Error Depth ("RED") is the relation of summary error depth for all test documents of the class [sum $E_k$] to the number of documents (I) in the class:

$$E_{ra} = \Sigma E_k / I$$

In illustrative embodiments, step 730 includes determining the "tuning intensity" for each class of the plurality of classes.

The tuning intensity for each class is based on the Relative Error Depth of that class. In illustrative embodiments, the tuning intensity of selected by comparing the absolute value of the Relative Error Depth for the class to a pre-determined threshold, and selecting as the tuning intensity a tuning intensity corresponding to the result of that comparison.

For example, according to Table I below, a class having a relative error depth of greater than or equal to 0.375 will have a turning intensity of "1." A class having a relative error depth of greater than or equal to 0.125 but less than 0.375 will have a turning intensity of "2." A class having a relative error depth of greater than or equal to 0.0625 but less than 0.125 will have a turning intensity of "3." A class having a relative error depth of greater than or equal to 0.0125 but less than 0.0625 will have a turning intensity of "4." A class having a relative error depth of less than 0.0125 will have a turning intensity of "5."

TABLE I

| Relative Error Depth | Intensity Level | $M_{adj}$ | $W_p$ | $W_n$ |
|---|---|---|---|---|
| >0.375 | 1 | 5 | 3.0 | −2.0 |
| >0.125, ≤0.375 | 2 | 4 | 2.0 | −1.5 |
| >0.0625, ≤0.125 | 3 | 3 | 1.5 | −1.0 |
| >0.0125, ≤0.0625 | 4 | 2 | 1.0 | −0.5 |
| <0.0125 | 5 | 0 | N/A | N/A |

Each tuning intensity level defines parameters that are inputs to the process of tuning a document classification for each iteration. Specifically, in keeping with the example of Table I, the parameters include the number of documents that are added to class definitions, and weights for the added documents, wherein:

$M_{adj}$ is the number of test documents to be used in adjusting class vectors in a given iteration; and $W_p$ is the weight (or weight factor) used to update the class vector of a document's pre-specified document class; and $W_n$ is the weight (or weight factor) used to update the class vector a misclassified document's resulting class:

Step 740 includes updating the class definition of each class, using the error depths from step 720 and tuning intensity from step 730.

In illustrative embodiments, the misclassified documents are sorted by descending error depth $E_k$, and a number ($M_{adj}$) of documents with highest error depth are selected. In illustrative embodiments, correctly classified documents (documents with $E_k=0$) are not used in the tuning process of step 740.

In illustrative embodiments, with the tuning intensity level found for each class, step 740 selects particular misclassified documents to move (or "tune") class definitions. The number of selected misclassified documents is determined by the tuning intensity level (e.g., $M_{adj}$ from the table above), and in illustrative embodiments the number of selected misclassified documents is a subset of (i.e., is fewer than) all of the misclassified documents. To that end, step 740 selects the misclassified documents having the greatest error depths. In keeping with the example of the table above, if a given tuning intensity level indicates that the number of test documents ($M_{adj}$) to be used in adjusting class vectors in a given iteration is five (5), then step 740 will select the five misclassified documents having the five highest error depths. Similarly, if a given tuning intensity level indicates that the number of test documents ($M_{adj}$) to be used in adjusting class vectors in a given iteration is three (3), then step 740 will select the three misclassified documents having the three highest error depths. Each selected misclassified document is also removed from the test set (see Step 650) after it is used to tune the classifications.

Illustrative embodiments use each selected misclassified document to tune the class definition (e.g., the class vector of the resulting class), or the class definition (e.g., the class vector of the misclassified document's actual (pre-specified) class), or both the class definition of the resulting class and the class definition of the misclassified document's actual (pre-specified) class.

In illustrative embodiments that assign documents to classes using a class vector model, the embedding vector for each misclassified document is added to its resulting class (R) using the negative weight ($W_n$) indicated by the intensity level. In keeping with the example of the table above, intensity level 1 indicates that the negative weight is negative 2.0 (i.e., $W_n=-2.0$). Similarly, intensity level 3 indicates that the negative weight is negative 1.0 (i.e., $W_n=-1.0$). This process is described further in connection with FIG. 7B. This moves incorrect (picked by the classifier) class away from given document in document vector space.

In illustrative embodiments that assign documents to classes using a class vector model, the embedding vector for each misclassified document is added to its actual (pre-specified) class ($A_k$) using the positive weight ($W_p$) indicated by the intensity level. In keeping with the example of the table above, intensity level 1 indicates that the positive weight is 3.0 (i.e., $W_p=3.0$). Similarly, intensity level 3 indicates that the positive weight is 1.5 (i.e., $W_p=1.5$). This process is described further in connection with FIG. 7C. This moves a correct (but not picked by the classifier) class towards the given document in vector space.

In illustrative embodiments that assign documents to classes using a language statistical model, the class definition (for a document's pre-specified class, and/or the document's resulting class) is updated at step 740 by updating the weights of characteristic words/combinations based on the characteristic words/combinations in the subset of misclassified documents.

In illustrative embodiments that assign documents to classes using a neural network, a neural network model is trained to assess each document and to produce a plurality of outputs for each such document. Each output of the neural network is a probability that the document belongs to one of classes. The document is assigned to the class that corresponds to the highest output from the neural network. In embodiments that assign a document to a class using a neural network model, the class definition is updated at step 740 by retraining each neural network using the subset of misclassified documents as part of the training set for the neural network.

In illustrative embodiments that assign documents to classes using a named entity recognition ("NER") model, a named entity recognition system finds Named Entities in a given document. Based on the number of discovered Named Entities for each document class, and on a relevance value for each of the Named Entities discovered, a NER_similarity value is calculated for each class. The document is assigned to whichever class has the highest NER_similarity value. In embodiments that assign a document to a class using a named entity recognition model, the class definition is updated at step 740 by revising the named entity recognition model by using the subset of misclassified documents to define the algorithm for producing the NER_similarity value.

Then, the misclassified test document is removed from the test set (step 650 of FIG. 6), since now it is a part of class definitions. Small accuracy improvement on the used test set is explained by removing documents that produce errors.

However, accuracy improvement observed during the procedure testing is much more pronounced. For one document added to class definitions, 3-5 other document classification errors were fixed due to redefined classes.

The inventors have discovered that using a subset of misclassified documents in the methods described herein, rather than using all of the misclassified documents, with just a few iterations, successfully tunes the system. Moreover, accuracy improvement observed during the procedure testing is much more pronounced. For one document added to class definitions, three to five other document classification errors were fixed due to redefined classes.

FIG. 7B is a flowchart that illustrates an embodiment of a method of adjusting a class definition of a class (a resulting class) into which documents have been misclassified. The method of FIG. 7B may be described as moving, in semantic space (or vector space), the class definition of a resulting class further from each document misclassified into the resulting class. In embodiments in which the class definition of a class is defined by a class vector, the resulting class has a corresponding set of documents known to be correctly classified within the class, and that class vector of that class is defined as the mean of embedding vectors of those documents known to correctly be within the class.

At step 742, the method identifies a subset of the documents that were misclassified into the class by the step of classifying. The documents of the subset may be described as the documents most valuable for updating the class vector of the class.

As described above, each misclassified document of the subset has a corresponding embedding vector.

At step 743, the method identifies a weight (or weighting factor) corresponding to each misclassified document in the subset of misclassified documents, such that each misclassified document in the subset of misclassified documents has a corresponding weight. The weight is a numerical value. In illustrative embodiments, the weight has a negative numerical value. In some embodiments, the weight is negative one (−1) by default, but may have other values as described below. The weight is applied to the document's embedding vector for use in updating the class vector, as described below.

At step 744, the method determines the updated class definition. In illustrative embodiments, updating the class vector of a class includes computing the mean of a set of embedding vectors, the set of embedding vectors including the embedding vectors of the documents correctly classified into the class, and weighted embedding vectors of the documents that were misclassified into the class by the step of classifying.

At step 745, the method sets the class definition to the updated class definition that was determined at step 744. In embodiments in which the class definition of a class is defined by a class vector, the method sets the class vector to the updated class vector that was determined at step 744.

FIG. 7C is a flowchart that illustrates an embodiment of a method 751 of adjusting class definition of each class for which one of the of its test documents was mis-classified into a different class. With respect to a document's pre-specified class, a document having a resulting class that is not the same as its pre-specified class may be referred-to as a "false negative." Consequently, a misclassified document may be referred-to as a "false positive" with regard to its resulting class, and as a "false negative" with regard to its pre-specified class.

The method of FIG. 7C may be described as moving, in semantic space (or vector space), the class definition of a pre-specified class toward (e.g., toward the embedding vector of) each document misclassified into an incorrect resulting class. Such a class may be referred-to as a "target" class. In illustrative embodiments, the target class has a corresponding set of documents known to be correctly classified within the class (each of which is a pre-specified document). In embodiments in which the class definition is defined by a class vector, and the class vector of that class is defined as the mean of embedding vectors (pre-specified embedding vectors) of those pre-specified documents.

As illustrated in the flowchart of FIG. 7C, the method updates the class definition for the pre-specified class of each misclassified document by, at step 752, identifying target classes.

Step 753 includes identifying a weight (or weighting factor) for the misclassified document, and more specifically for the embedding vector the misclassified documents. The weight is a numerical value. In illustrative embodiments, the weight has a positive numerical value. In some embodiments, the weight is one (1) by default, but may have other values as described below. The weight is applied to the document's embedding vector for use in updating the class vector of the target class.

At step 754, the method determines the updated class definition. In embodiments in which a class definition is defined by a class vector, step 754 determines the class definition for the target class by calculating the mean of (a) the set of pre-specified document vectors and (b) the weighted embedding vectors of each test document that (i) has said target class as its pre-specified class and that (ii) is also a misclassified document.

Step 755 sets the class definition of the target class to the updated class definition from step 754. In subsequent iterations, if any, the updated class vector from step 754 is the pre-specified class definition of the target class.

In accordance with an illustrative embodiment, a method of training a natural language processing-based classification system includes providing a set of document classes, each of which has a corresponding unique class vector, and a test set of documents, in which each test document of the test set has a corresponding unique embedding vector and a pre-specified class (or "actual" class) from among the set of document classes.

The method includes operating the natural language processing-based classification system to classify each document of the test set (i.e., to assign each test document to a one of the document classes from the set of document classes). The document class to which a test document is classified in this way may be referred-to as that document's "resulting class."

In practice, the resulting class of some of the test documents will be the same as that document's pre-specified class. Those documents are properly classified.

However, in practice the resulting class of some of the test documents are not the same as that document's pre-specified class. Those documents are misclassified documents.

Illustrative embodiments select a subset of misclassified documents (e.g., the misclassified documents having the highest error depths) and adds those selected documents to class definitions to improve accuracy.

For example, each selected misclassified document is added to class definitions twice:

1. With positive weight to the correct class (i.e., the misclassified document's pre-specified class) to move correct class center towards the misclassified document's position in vector space; and 2. With negative weight to the incorrect resulting class— to move resulting class center away from the misclassified document's position in vector space.

The document is then removed from the testing set to produce a reduced testing set. The foregoing steps may be repeated one or more times, each time with a corresponding reduced testing set. One trained, the natural language processing-based classification system may be used to classify documents that were not part of the test set.

In an illustrative embodiment, a computer-implemented method includes training the natural language processing-based classification system by:

providing a plurality of pre-specified class vectors, wherein each pre-specified class vector of the plurality of pre-specified class vectors is defined by a corresponding set of pre-specified document vectors, and each class vector of the plurality of pre-specified class vectors is uniquely associated with a corresponding document class selected from a plurality of document classes;

providing a test set including a plurality of test documents, each test document in the test set having a corresponding embedding vector, and each test document in the test set having a pre-specified class assignment to a class selected from the plurality of document classes;

classifying each document of the plurality of test documents in the test set into a class selected from a plurality of document classes, such that each class has a plurality of correctly classified test documents and a set of misclassified test documents, by:

determining, for each document of the plurality of test documents in the test set, which class vector of the set of pre-specified class vectors is closest to the test document's embedding vector, and assigning said test document to the class corresponding to the class vector that is closest to the document's embedding vector, said class being the test document's resulting class.

After training the method includes, for each document class of the plurality of document classes:

identifying a set of test documents from the test set that have been misclassified into said document class by the act of classifying, by:

for each test document classified into said document class by the act of classifying, comparing the document's pre-specified class assignment to the test document's resulting class, and determining which of said test documents have a resulting class different from its pre-specified class, each document having a resulting class different from its pre-specified class being a misclassified document;

identifying, from the set of misclassified documents, a corresponding subset of misclassified document vectors;

modifying the class vector of the class to move the class vector in semantic space away from the misclassified document vectors, by setting said class vector equal to the mean of (a) positively weighted pre-specified document vectors of the class and embedding vectors of the correctly classified test documents and (b) negatively weighted misclassified document vectors, such that the class has a modified class vector; and and removing the misclassified documents from the test set to produce a reduced test set.

Some embodiments include, subsequent to assigning said test document to the class corresponding to the class vector that is closest to the document's embedding vector:

identifying each misclassified document from the test set; and for each such identified misclassified document, identifying the class vector corresponding to said misclassified document's pre-specified class assignment, to produce a set of target class vectors. Also, for each target class vector of the set of target class vectors, the method includes:

moving said target vector in semantic space closer to the embedding vectors of each test document that (i) has said class as its pre-specified class and that (ii) is also a misclassified document, by:

updating said target class vector as the mean of (a) its set of pre-specified document vectors and (b) embedding vectors of each test document that (i) has said class as its pre-specified class and that (ii) is also a misclassified document.

In some such embodiments the method includes, subsequent to producing the reduced test set: classifying each document of the plurality of test documents in the reduced test set into a class selected from a plurality of document classes, such that each class has a plurality of correctly classified test documents and a set of misclassified test documents. Such classifying may include, for example, determining, for each document of the plurality of test documents in the test set, which class vector is closest to the test document's embedding vector, and assigning said test document to the class corresponding to the class vector that is closest to the document's embedding vector, said class being the test document's resulting class.

Such embodiments includes, subsequently for each document class of the plurality of document classes:

identifying a set of test documents from the reduced test set that have been misclassified into said document class by the act of classifying, by:

for each test document classified into said document class by the act of classifying, comparing the document's pre-specified class assignment to the test document's resulting class, and determining which of said test documents have a resulting class different from its pre-specified class, each document having a resulting class different from its pre-specified class being a misclassified document;

identifying, from the set of misclassified documents, a corresponding subset of misclassified document vectors;

modifying the class vector of the class by setting said class vector equal to the mean of (a) positively weighted pre-specified document vectors of the class and embedding vectors of the correctly classified test documents and (b) negatively weighted misclassified document vectors; and removing the misclassified documents from the reduced test set to produce a further reduced test set.

Some embodiments include, after training the natural language processing-based classification system, using the natural language processing-based classification system to classify a set of documents. For example, classifying a set of documents may include:

providing a set of unclassified documents to be classified, each document of the set of unclassified documents to be classified having an associated embedding vector; and classifying, using the classification system, each document in the set of unclassified documents into a one of the classes by assigning to each such document a final assigned class, the final assigned class being a class having an updated class vector closest to the document's embedding vector.

In some such embodiments, each document of the set of unclassified documents to be classified is not a member of the test set.

In some such embodiments, class of the plurality of document classes has assigned to it at least one document of the plurality of test documents of the test set.

In some such embodiments, determining, for each document of the plurality of test documents in the test set, which class vector of the set of pre-specified class vectors is closest to the document's embedding vector includes:

determining, for each class vector of the set of pre-specified class vectors, its cosine similarity to the document's embedding vector, to produce a plurality of cosine similarity values; and selecting, as the pre-specified class vector closest to the document's embedding vector, the pre-specified class vector having the greatest cosine similarity value from the plurality of cosine similarity values.

Yet another embodiment includes a system, the system including:

a computer processor coupled to a set of non-transitory computer memories, the non-transitory computer memories storing computer-executable instructions that, when executed by the computer processor, cause the computer processor perform a process. The process includes:

providing a plurality of pre-specified class vectors, wherein each pre-specified class vector of the plurality of pre-specified class vectors is defined by a corresponding set of pre-specified document vectors, and each class vector of the plurality of pre-specified class vectors is uniquely associated with a corresponding document class selected from a plurality of document classes;

providing a test set including a plurality of test documents, each test document in the test set having a corresponding embedding vector, and each test document in the test set having a pre-specified class assignment to a class selected from the plurality of document classes;

classifying each document of the plurality of test documents in the test set into a resulting class selected from a plurality of document classes, such that each resulting class has a plurality of correctly classified test documents and a set of misclassified test documents, by:

determining, for each document of the plurality of test documents in the test set, which class vector of the set of pre-specified class vectors is closest to the test document's embedding vector, and assigning said test document to the class corresponding to the class vector that is closest to the document's embedding vector, said class being the test document's resulting class.

The process also includes, for each document class of the plurality of document classes:

identifying a set of test documents from the test set that have been misclassified into said document class by the act of classifying, by:

for each test document classified into said document class by the act of classifying, comparing the document's pre-specified class assignment to the test document's resulting class, and determining which of said test documents have a resulting class different from its pre-specified class, each document having a resulting class different from its pre-specified class being a misclassified document;

identifying, from the set of misclassified documents, a corresponding subset of misclassified document vectors;

modifying the class vector of the class by setting said class vector equal to the mean of (a) positively weighted pre-specified document vectors of the class and embedding vectors of the correctly classified test documents and (b) negatively weighted misclassified document vectors, such that the class has a modified class vector; and removing the misclassified documents from the test set to produce a reduced test set.

In some embodiments of such a system, the process further includes, subsequent to assigning said test document to the class corresponding to the class vector that is closest to the document's embedding vector:

identifying each misclassified document from the test set;

for each such identified misclassified document, identifying the class vector corresponding to said misclassified document's pre-specified class assignment, to produce a set of target class vectors; and for each target class vector of the set of target class vectors, updating said target class vector as the mean of (a) its set of pre-specified document vectors and (b) embedding vectors of each test document that (i) has said class as its pre-specified class and that (ii) is also a misclassified document.

In some embodiments of such a system, the process further includes, subsequent to producing the reduced test set:

classifying each document of the plurality of test documents in the reduced test set into a class selected from a plurality of document classes, such that each class has a plurality of correctly classified test documents and a set of misclassified test documents, by:

determining, for each document of the plurality of test documents in the test set, which class vector is closest to the test document's embedding vector, and assigning said test document to the class corresponding to the class vector that is closest to the document's embedding vector, said class being the test document's resulting class; and subsequently for each document class of the plurality of document classes:

identifying a set of test documents from the reduced test set that have been misclassified into said document class by the act of classifying, by:

for each test document classified into said document class by the act of classifying, comparing the document's pre-specified class assignment to the test document's resulting class, and determining which of said test documents have a resulting class different from its pre-specified class, each document having a resulting class different from its pre-specified class being a misclassified document;

identifying, from the set of misclassified documents, a corresponding subset of misclassified document vectors;

modifying the class vector of the class by setting said class vector equal to the mean of (a) positively weighted pre-specified document vectors of the class and embedding vectors of the correctly classified test documents and (b) negatively weighted misclassified document vectors; and removing the misclassified documents from the reduced test set to produce a further reduced test set.

In some embodiments of such a system, the set of computer memories stores the set of unclassified documents to be classified into the set of document classes, each document of the set of unclassified documents having a unique corresponding embedding vector.

In some embodiments of such a system, the pre-specified class assignment of test documents in the test set is pre-assigned by a human assessor In some embodiments of such a system, each class of the plurality of document classes has assigned to it at least one test document of the plurality of test documents of the test set.

In some embodiments of such a system, determining, for each document of the plurality of test documents in the test set, which class vector of the set of pre-specified class vectors is closest to the document's embedding vector, includes:

(a) determining, for each class vector of the set of pre-specified class vectors, its cosine similarity to the document's embedding vector, to produce a plurality of cosine similarity values; and (b) selecting, as the pre-specified class vector closest to the document's embedding vector, the pre-specified class vector having the greatest cosine similarity value from the plurality of cosine similarity values.

Some embodiments of such a system also include a trainer configured to train the classifier configured to produce, for each document class, the updated class vector for said class, and replace the class vector for said class with the updated class vector.

Yet another embodiment includes a non-transitory computer readable medium storing computer-executable code, the computer-executable code including:

code for training the natural language processing-based classification system by:

providing a plurality of pre-specified class vectors, wherein each pre-specified class vector of the plurality of pre-specified class vectors is defined by a corresponding set of pre-specified document vectors, and each class vector of the plurality of pre-specified class vectors is uniquely associated with a corresponding document class selected from a plurality of document classes; and providing a test set including a plurality of test documents, each test document in the test set having a corresponding embedding vector, and each test document in the test set having a pre-specified class assignment to a class selected from the plurality of document classes.

The code also includes code for classifying each document of the plurality of test documents in the test set into a class selected from a plurality of document classes, such that each class has a plurality of correctly classified test documents and a set of misclassified test documents, by:

determining, for each document of the plurality of test documents in the test set, which class vector of the set of pre-specified class vectors is closest to the test document's embedding vector, and assigning said test document to the class corresponding to the class vector that is closest to the document's embedding vector, said class being the test document's resulting class.

The code also includes code for, for each document class of the plurality of document classes:

identifying a set of test documents from the test set that have been misclassified into said document class by the act of classifying, by:

for each test document classified into said document class by the act of classifying, comparing the document's pre-specified class assignment to the test document's resulting class, and determining which of said test documents have a resulting class different from its pre-specified class, each document having a resulting class different from its pre-specified class being a misclassified document;

identifying, from the set of misclassified documents, a corresponding subset of misclassified document vectors;

modifying the class vector of the class by setting said class vector equal to the mean of (a) positively weighted pre-specified document vectors of the class and embedding vectors of the correctly classified test documents and (b) negatively weighted misclassified document vectors, such that the class has a modified class vector; and removing the misclassified documents from the test set to produce a reduced test set.

In some such embodiments, the computer-executable code further includes code for:

subsequent to assigning said test document to the class corresponding to the class vector that is closest to the document's embedding vector:

identifying each misclassified document from the test set;

for each such identified misclassified document, identifying the class vector corresponding to said misclassified document's pre-specified class assignment, to produce a set of target class vectors; and for each target class vector of the set of target class vectors, updating said target class vector as the mean of (a) its set of pre-specified document vectors and (b) embedding vectors of each test document that (i) has said class as its pre-specified class and that (ii) is also a misclassified document.

In some such embodiments, the computer-executable code further includes code for:

subsequent to producing the reduced test set:

classifying each document of the plurality of test documents in the reduced test set into a class selected from a plurality of document classes, such that each class has a plurality of correctly classified test documents and a set of misclassified test documents, by:

determining, for each document of the plurality of test documents in the test set, which class vector is closest to the test document's embedding vector, and assigning said test document to the class corresponding to the class vector that is closest to the document's embedding vector, said class being the test document's resulting class; and subsequently for each document class of the plurality of document classes:

identifying a set of test documents from the reduced test set that have been misclassified into said document class by the act of classifying, by:

for each test document classified into said document class by the act of classifying, comparing the document's pre-specified class assignment to the test document's resulting class, and determining which of said test documents have a resulting class different from its pre-specified class, each document having a resulting class different from its pre-specified class being a misclassified document;

identifying, from the set of misclassified documents, a corresponding subset of misclassified document vectors;

modifying the class vector of the class by setting said class vector equal to the mean of (a) positively weighted pre-specified document vectors of the class and embedding vectors of the correctly classified test documents and (b) negatively weighted misclassified document vectors; and removing the misclassified documents from the reduced test set to produce a further reduced test set.

In some such embodiments, the computer-executable code further includes code for:

after training the natural language processing-based classification system, using the natural language processing-based classification system to classify a set of documents, by:

providing a set of unclassified documents to be classified, each document of the set of unclassified documents to be classified having an associated embedding vector, wherein each document of the set of unclassified documents to be classified is not member of the test set; and classifying, using the classification system, each document in the set of unclassified documents into a one of the classes by assigning to each such document a final assigned class, the final assigned class being a class having an updated class vector closest to the document's embedding vector.

In accordance with yet another illustrative embodiment, training a natural language processing-based classification system to classify each document of a plurality of electronically-stored documents into a class selected from a plurality of classes includes: (1) providing a plurality of pre-specified class vectors, each class vector of the plurality of pre-specified class vectors associated with a corresponding class of the plurality of document classes; and (2) providing a test set including a plurality of electronically-stored documents, each document in the test set having a corresponding embedding vector, and each document in the test set having a pre-specified class assignment to a class selected from the plurality of document classes; and subsequently (3) classifying each document in the test set into a one of the classes of the plurality of classes by assigning to each such document an assigned class, the assigned class being a class having a class vector closest to the document's embedding vector; and (4) after classifying each document of the test set, identifying each document from the test set that was misclassified (each such document being a misclassified document); and (5) for each class having a misclassified document, adjusting the class vector for said class by producing a resulting vector based on the embedded vectors of the misclassified documents, and setting the class vector of the document class equal to the resulting vector to produce an updated class vector.

An illustrative embodiment includes a computer-implemented method, the method including:

training a natural language processing-based classification system to classify each document of a plurality of electronically-stored text documents into a class selected from a plurality of document classes, by:

providing a plurality of pre-specified class vectors, each class vector of the plurality of pre-specified class vectors uniquely associated with a corresponding document class selected from the plurality of document classes;

providing a test set including a plurality of test documents, each test document in the test set having a corresponding embedding vector, and each test document in the test set having a pre-specified class assignment to a class selected from the plurality of document classes;

classifying each document of the plurality of test documents in the test set into a class selected from a plurality of document classes by:

determining, for each document of the plurality of test documents in the test set, which class vector of the set of pre-specified class vectors is closest to the test document's embedding vector, and assigning to said test document the class corresponding to the class vector that is closest to the document's embedding vector, said class being the test document's assigned class; and subsequently for each document class from the plurality of document classes:

identifying a set of test documents from the test set that have been misclassified into said document class by the act of classifying, by:

for each test document classified into said document class by the act of classifying, comparing the document's pre-specified class assignment to the test document's assigned class, and determining which of said test documents have an assigned class different from its pre-specified class, each document having an assigned class different from its pre-specified class being a misclassified document;

identifying, for each misclassified document, the misclassified document's embedding vector, to produce a set (Fi) of misclassified document vectors;

determining the mean of the vectors of the set of misclassified document vectors [mean $(F_i)$];

determining an adjustment vector $(A_i)$, the adjustment vector being the negative of the mean of the misclassified document vectors $[A_i=-1*\text{mean }(F_i)]$;

receiving an adjustment intensity coefficient [K], where the intensity coefficient [K] has a value between 0 and 1;

moving the class vector of the document class with the adjustment vector to produce a resulting vector $[PR_i]$, using the following equation:

$$PR_i=K*A_i+(1-K)*P_i; \text{ and}$$

setting the class vector of the document class equal to the resulting vector [PR] to produce an updated class vector.

Some embodiments further include after training the natural language processing-based classification system, using the natural language processing-based classification system to classify a set of documents, by:

providing a set of unclassified documents to be classified, each document of the set of unclassified documents to be classified having an associated embedding vector; and classifying, using the classification system, each document in the set of unclassified documents into a one of the classes by assigning to each such document a final assigned class, the final assigned class being a class having an updated class vector closest to the document's embedding vector.

In some such embodiments, each document of the set of unclassified documents to be classified is not a member of the test set.

In some embodiments, the pre-specified class assignment of test documents in the test set is assigned by a human assessor.

In some embodiments, each class of the plurality of document classes has assigned to it at least one document of the plurality of test documents of the test set.

In some embodiments, determining, for each document of the plurality of test documents in the test set, which class vector of the set of pre-specified class vectors is closest to the document's embedding vector, includes:

determining, for each class vector of the set of pre-specified class vectors, its cosine similarity to the document's embedding vector, to produce a plurality of cosine similarity values; and selecting, as the pre-specified class vector closest to the document's embedding vector, the pre-specified class vector having the greatest cosine similarity value from the plurality of cosine similarity values.

Another embodiment is a system for classifying documents into a plurality of pre-defined document classes, the system including:

a computer processor coupled to a set of computer memories, the set of computer memories storing a plurality of updated class vectors, each class vector of the plurality of class vectors corresponding uniquely to a corresponding one of the document classes from the plurality of document classes, said updated class vectors generated by a process, the process including:

providing a plurality of pre-specified class vectors, each pre-specified class vector of the plurality of pre-specified class vectors uniquely associated with a corresponding document class selected from the plurality of document classes;

providing a test set including a plurality of test documents, each test document in the test set having a corresponding test embedding vector, and each test document in the test set having a pre-specified class assignment to a class selected from the plurality of document classes;

determining, for each document of the plurality of test documents in the test set, which class vector of the set of pre-specified class vectors is closest to the document's embedding vector, and assigning to said document the class corresponding to the class vector that is closest to the document's embedding vector; and subsequently for each document class from the plurality of document classes:

identifying a set of test documents from the test set that have been misclassified into said document class by the act of classifying, by:

(i) for each document in said document class, comparing the document's pre-specified class assignment to the document's assigned class, and (ii) determining which of said documents have an assigned class different from its pre-specified class, each document having an assigned class different from its pre-specified class being a misclassified document;

identifying, for each misclassified document, the misclassified document's embedding vector, to produce a set $(F_i)$ of misclassified document vectors;

determining the mean of the misclassified document vectors [mean $(F_i)$];

determining an adjustment vector $(A_i)$, the adjustment vector being the negative of the mean of the misclassified document vectors $[A_i = -1 * \text{mean } (F_i)]$;

receiving an adjustment intensity coefficient [K], where the intensity coefficient [K] has a value between 0 and 1;

moving the class vector of the document class with the adjustment vector to produce a resulting vector [$PR_i$], using the following equation:

$$PR_i = K * A_i + (1-K) * P_i; \text{ and}$$

setting the class vector of the document class equal to the resulting vector [$PR_i$] to produce an updated class vector; and a classifier configured to assign, to a class from the set of classes, each document of a set of unclassified documents, said class being the final assigned class, the final assigned class being a class having updated class vector closest to the document's embedding vector.

In some embodiments, each document of the set of unclassified documents to be classified is not a member of the test set.

In some embodiments, the set of computer memories stores the set of unclassified documents to be classified into the set of document classes, each document of the set of unclassified documents having a unique corresponding embedding vector.

In some embodiments, the pre-specified class assignment of test documents in the test set is assigned by a human assessor In some embodiments, each class of the plurality of document classes has assigned to it at least one test document of the plurality of test documents of the test set.

In some embodiments, determining, for each document of the plurality of test documents in the test set, which class vector of the set of pre-specified class vectors is closest to the document's embedding vector, includes: (a) determining, for each class vector of the set of pre-specified class vectors, its cosine similarity to the document's embedding vector, to produce a plurality of cosine similarity values; and (b) selecting, as the pre-specified class vector closest to the document's embedding vector, the pre-specified class vector having the greatest cosine similarity value from the plurality of cosine similarity values.

Some embodiments further include a trainer configured to train the classifier configured to produce, for each document class, the updated class vector for said class, and replace the class vector for said class with the updated class vector.

Another embodiment is a non-transient computer readable medium storing computer-executable code for training a natural language processing-based classification system to classify each document of a plurality of electronically-stored text documents into a class selected from a plurality of classes, the computer-executable code including:

code for accessing a plurality of pre-specified class vectors, each class vector of the plurality of pre-specified class vectors associated uniquely with a corresponding document class selected from the plurality of document classes;

code for accessing a test set including a plurality of test documents, each document in the test set having a corresponding test embedding vector, and each document in the test set having a pre-specified class assignment to a class selected from the plurality of document classes;

code for classifying each document of the plurality of test documents, by:

determining, for each document of the plurality of documents in the test set, which class vector of the set of pre-specified class vectors is closest to the document's embedding vector, and assigning to said document the class corresponding to the class vector that is closest to the document's embedding vector, said class being the document's assigned class;

code for, subsequent to classifying, for each document class from the plurality of document classes:

identifying a set of test documents from the test set that have been misclassified into said document class by the act of classifying, by:

for each document in said document class, comparing the document's pre-specified class assignment to the document's assigned class, and determining which of said documents have an assigned class different from its pre-specified class, each document having an assigned class different from its pre-specified class being a misclassified document;

identifying, for each misclassified document, the misclassified document's embedding vector, to produce a set (F) of misclassified document vectors;

determining the mean of the misclassified document vectors [mean $(F_i)$];

determining an adjustment vector $(A_i)$, the adjustment vector being the negative of the mean of the misclassified document vectors $[A_i=-1*\text{mean } (F_i)]$;

receiving an adjustment intensity coefficient [K], where the intensity coefficient [K] has a value between 0 and 1;

moving the class vector of the document class with the adjustment vector to produce a resulting vector $[PR_i]$, using the following equation:

$$PR_i=K*A_i+(1-K)*P_i; \text{ and}$$

setting the class vector of the document class equal to the resulting vector $[PR_i]$ to produce an updated class vector.

Some embodiments of computer readable medium further include code for providing a set of unclassified documents to be classified, each document of the set of unclassified documents to be classified having an associated embedding vector; and code for classifying, using the classification system, each document in the set of unclassified documents into a one of the classes by assigning to each such document a final assigned class, the final assigned class being a class having an updated class vector closest to the document's embedding vector.

In some embodiments, each document of the set of unclassified documents to be classified is not a member of the test set.

In some embodiments, the pre-specified class assignment of test documents in the test set was assigned by a human assessor prior to execution of the code for accessing a test set.

In some embodiments, pursuant to execution of the code for classifying each document of the plurality of test documents, each class of the plurality of document classes has assigned to it at least one document of the plurality of documents of the test set.

In some embodiments, code for determining, for each document of the plurality of documents in the test set, which class vector of the set of pre-specified class vectors is closest to the document's embedding vector, and assigning to said document the class corresponding to the class vector that is closest to the document's embedding vector, includes:

code for determining, for each class vector of the set of pre-specified class vectors, its cosine similarity to the document's embedding vector, to produce a plurality of cosine similarity values; and code for selecting, as the pre-specified class vector closest to the document's embedding vector, the pre-specified class vector having the greatest cosine similarity value from the plurality of cosine similarity values.

Various embodiments may be characterized by the potential claims listed in the paragraphs following this paragraph (and before the actual claims provided at the end of this application). These potential claims form a part of the written description of this application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public.

Without limitation, potential subject matter that may be claimed (prefaced with the letter "PC" so as to avoid confusion with the actual claims presented below) includes:

PC1. A computer-implemented method comprising: training a natural language processing-based classification system to classify each document of a plurality of electronically-stored documents into a class selected from a plurality of classes $[C_i, i=1, 2 \ldots N]$, by: providing a plurality of pre-specified class vectors $[P_i, i=1, 2 \ldots N]$, each class vector of the plurality of pre-specified class vectors associated with a corresponding class of the plurality of document classes $[C_i, i=1, 2 \ldots N]$; providing a test set $[T_j, j=1, 2 \ldots M]$ comprising a plurality of electronically-stored documents, each document in the test set having a corresponding embedding vector, and each document in the test set having a pre-specified class assignment to a class selected from the plurality of document classes; classifying each document in the test set into a one of the classes of the plurality of classes by assigning to each such document an assigned class, the assigned class being a class having a class vector $(P_i)$ closest to the document's embedding vector; after classifying each document of the test set, identifying each document from the test set that was misclassified (each such document being a misclassified document); and for each class having a misclassified document, adjusting the class vector for said class by producing a resulting vector $[PR_i]$ based on the embedded vectors of the misclassified documents, and setting the class vector $[P_i]$ of the document class $[C_i]$ equal to the resulting vector $[PR_i]$ to produce an updated class vector.

PC11. A computer-implemented method comprising of training a natural language processing-based classification system to classify each document of a plurality of electronically-stored documents into a document class selected from a plurality of document classes, the method comprising:

providing a natural language processing-based classification system;

classifying, by the natural language processing-based classification system, each document of a set of test documents using the classification system, each of said documents being a classified test document and having an assigned class;

identifying test documents, from among the classified test documents, that have been misclassified; and adjusting the natural language processing-based classification system based on analysis of embedding vectors of the misclassified test documents to improve the accuracy of the natural language processing-based classification system.

PC12: The method of PC11, wherein each test document has a pre-assigned classification.

PC13: The method of any pf PC11-PC12, wherein each test document has a pre-assigned classification, which pre-assigned classification is assigned by a human assessor.

PC14: The method of any of PC11-PC13, wherein each test document has a pre-assigned classification, and wherein identifying test documents, from among the classified test documents, that have been misclassified comprises comparing, for each classified test document, its pre-assigned classification to its assigned class, a misclassified test document being a classified test document for which its pre-assigned classification does not match its assigned class.

PC15: The method of any of PC11-PC14, wherein providing a natural language processing-based classification system comprises providing a plurality of pre-specified class vectors, each class vector of the plurality of pre-specified class vectors associated with a corresponding document class selected from the plurality of document classes.

PC17: The method of any of PC11-PC15, wherein classifying, by the natural language processing-based classification system, each document of a set of test documents using the classification system comprises: determining, for each document of the plurality of test documents, which class vector of the set of pre-specified class vectors is closest to the document's embedding vector, and assigning to said document the class corresponding to the class vector that is closest to the document's embedding vector.

PC18: The method of any of PC11-PC17, wherein adjusting the natural language processing-based classification system based on analysis of embedding vectors of the misclassified test documents to improve the accuracy of the natural language processing-based classification system comprises:

identifying, for each misclassified document, the misclassified document's embedding vector, to produce a set of misclassified document vectors ($F_i$);

determining the mean of the misclassified document vectors [mean ($F_i$)];

determining an adjustment vector ($A_i$), the adjustment vector being the negative of the mean of the misclassified document vectors [$A_i=-1$*mean ($F_i$)];

receiving an adjustment intensity coefficient [K], where the intensity coefficient [K] has a value between 0 and 1;

moving the class vector [$P_i$] of the document class [$C_i$] with the adjustment vector to produce a resulting vector [$PR_i$], using the following equation:

$$PR_i=K*A_i+(1-K)*P_i;\ and$$

setting the class vector [$P_i$] of the document class [$C_i$] equal to the resulting vector [$PR_i$] to produce an updated class vector [$Z_i$].

PC31. A computer-implemented method comprising:

training a natural language processing-based classification system to classify each document of a plurality of electronically-stored text documents into a class selected from a plurality of classes [$C_i$, i=1, 2 . . . . N], by:

providing a plurality of pre-specified class vectors [$P_i$, i=1, 2 . . . . N], each class vector of the plurality of pre-specified class vectors associated with a corresponding document class selected from the plurality of document classes [$C_i$, i=1, 2 . . . . N];

providing a test set [$T_j$, j=1, 2 . . . . M] comprising a plurality of documents, each document in the test set having a corresponding embedding vector ($E_j$), and each document in the test set having a pre-specified class assignment to a class selected from the plurality of document classes;

determining, for each document of the plurality of documents in the test set, which class vector of the set of pre-specified class vectors is closest to the document's embedding vector, and assigning to said document the class corresponding to the class vector that is closest to the document's embedding vector; and subsequently for each document class [$C_i$] from the plurality of document classes:

identifying a set of documents from the test set that have been misclassified into said document class by the act of classifying, by:

for each document in said document class, comparing the document's pre-specified class assignment to the document's assigned class, and determining which of said documents have an assigned class different from its pre-specified class, each document having an assigned class different from its pre-specified class being a misclassified document;

identifying, for each misclassified document, the misclassified document's embedding vector, to produce a set of misclassified document vectors ($F_i$);

determining the mean of the misclassified document vectors [mean ($F_i$)];

determining an adjustment vector ($A_i$), the adjustment vector being the negative of the mean of the misclassified document vectors [$A_i=-1$*mean ($F_i$)];

receiving an adjustment intensity coefficient [K], where the intensity coefficient [K] has a value between 0 and 1;

moving the class vector [$P_i$] of the document class [$C_i$] with the adjustment vector to produce a resulting vector [$PR_i$], using the following equation:

$$PR_i=K*A_i+(1-K)*P_i;\ and$$

setting the class vector [$P_i$] of the document class [$C_i$] equal to the resulting vector [$PR_i$] to produce an updated class vector.

PC32. The method of claim PC31, further comprising, after training the natural language processing-based classification system, using the natural language processing-based classification system to classify a set of documents, by:

providing a set of documents to be classified, and each document of the set of documents to be classified having an associated embedding vector; and classifying, using the classification system, each document in the set of unclassified documents into a one of the classes by assigning to each such document an assigned class, the assigned class being a class having an updated class vector (Z) closest to the document's embedding vector.

PC33. The method of any of PC31-PC32, wherein each document of the set of documents to be classified is not a member of the test set.

PC34. The method of any of PC31-PC33, where the pre-specified class assignment of documents in the test set is assigned by a human assessor.

PC35. The method of any of PC31-PC34, wherein each class of the plurality of document classes has assigned to it at least one document of the plurality of documents of the test set.

PC36. The method of any of PC31-PC35, wherein determining, for each document of the plurality of documents in the test set, which class vector of the set of pre-specified class vectors is closest to the document's embedding vector comprises:

determining, for each class vector of the set of pre-specified class vectors, its cosine similarity to the document's embedding vector, to produce a plurality of cosine similarity values; and selecting, as the pre-specified class vector closest to the document's embedding vector, the pre-specified class vector having the greatest cosine similarity value from the plurality of cosine similarity values.

PC40: A computer-implemented method of improving a natural language processing-based classification system to classify each document of a plurality of electronically-stored text documents into a class selected from a plurality of document classes, the method comprising:

providing the natural language processing-based classification system previously configured to classify each document of a plurality of electronically-stored documents into a class selected from a plurality of documents;

providing a test set comprising a plurality of test documents;

classifying each of the test documents using the natural language processing-based classification system, each such test document consequently being a classified test document;

identifying misclassified test documents;

analyzing the misclassified test documents to produce an analysis of the misclassified test documents; and adjusting the natural language processing-based classification system based on the analysis of the misclassified test documents.

PC41: The method of PC40, further comprising: providing a plurality of pre-specified class vectors, each class vector of the plurality of pre-specified class vectors uniquely associated with a corresponding document class selected from the plurality of document classes.

PC42: The method of any of PC40-PC42, wherein each test document in the test set has a corresponding embedding vector, and each test document in the test set has a pre-specified class assignment to a class selected from the plurality of document classes.

PC43: The method of PC42, wherein identifying misclassified test documents comprises identifying, in each class, test documents having a pre-specified class assignment to a different class, each such test document being a misclassified test document.

PC44: The method of any of PC40-PC43, further comprising providing a plurality of pre-specified class vectors, each class vector of the plurality of pre-specified class vectors uniquely associated with a corresponding document class selected from the plurality of document classes.

PC45: The method of PC44, wherein classifying each of the test documents using the natural language processing-based classification system comprises:

determining, for each test document of the plurality of test documents in the test set, which class vector of the set of pre-specified class vectors is closest to the test document's embedding vector, and assigning to said test document the class corresponding to the class vector that is closest to the document's embedding vector, said class being the test document's assigned class.

PC46: The method of PC44 wherein determining, for each document of the plurality of test documents in the test set, which class vector of the set of pre-specified class vectors is closest to the document's embedding vector comprises:

determining, for each class vector of the set of pre-specified class vectors, its cosine similarity to the document's embedding vector, to produce a plurality of cosine similarity values; and selecting, as the pre-specified class vector closest to the document's embedding vector, the pre-specified class vector having the greatest cosine similarity value from the plurality of cosine similarity values.

PC47: The method of any of PC40-PC46, wherein the natural language processing-based classification system is not a neural network-based classification system.

PC48: The method of any of PC40-PC47, wherein document classification functionality of the natural language processing-based classification system is not implemented using a neural network.

PC101. A computer-implemented method comprising:

training the natural language processing-based classification system by:

providing a plurality of pre-specified class definitions, wherein each pre-specified class definition of the plurality of pre-specified class definitions is defined by a corresponding set of pre-specified documents, and each class definition of the plurality of pre-specified class definitions is uniquely associated with a corresponding document class selected from a plurality of document classes;

providing a test set comprising a plurality of test documents, each test document in the test set having a pre-specified class assignment to a class selected from the plurality of document classes;

automatically classifying each document of the plurality of test documents in the test set into a class selected from a plurality of document classes, such that each class has a plurality of correctly classified test documents and a set of misclassified test documents;

for each document class of the plurality of document classes:

identifying a set of test documents from the test set that have been misclassified into said document class by the act of classifying, by:

for each test document classified into said document class by the act of classifying, comparing the document's pre-specified class assignment to the test document's resulting class, and determining which of said test documents have a resulting class different from its pre-specified class, each document having a resulting class different from its pre-specified class being a misclassified document;

identifying, from the set of misclassified documents, a corresponding subset of misclassified documents;

modifying the class definition of the class to move the class definition in semantic space away from the misclassified documents; and removing the misclassified documents from the test set to produce a reduced test set.

PC102: The computer-implemented method of PC101, wherein:

each pre-specified class definition is defined by a class vector, said class vector being the mean of embedding vectors of its corresponding set of pre-specified documents, and each test document of the test set has a corresponding embedding vector; and wherein automatically classifying each document of the plurality of test documents in the test set into a class selected from a plurality of document classes comprises:

determining, for each document of the plurality of test documents in the test set, which class vector of the set of pre-specified class vectors is closest to the test document's embedding vector, and assigning said test document to the class corresponding to the class vector that is closest to the document's embedding vector, said class being the test document's resulting class.

PC103: The computer-implemented method of PC102, wherein modifying the class definition of the class to move the class definition in semantic space away from the misclassified documents comprises:

setting said class vector equal to the mean of (a) positively weighted pre-specified document vectors of the class and embedding vectors of the correctly classified test documents and (b) negatively weighted misclassified document vectors, such that the class has a modified class vector.

PC104: The computer-implemented method of PC101, wherein:

the class definition of each document class is defined pursuant to a Language Statistical Model, and wherein modifying the class definition of the class to move the class definition in semantic space away from the misclassified documents comprises updating the class definition by updating the weights of characteristic words and/or combinations used in the Language Statistical Model based on the characteristic words and/or combinations in the subset of misclassified documents.

PC105: The computer-implemented method of PC101, wherein:

the class definition of each document class is defined pursuant to a Neural Network Model, and wherein modifying the class definition of the class to move the class definition in semantic space away from the misclassified documents comprises retraining the neural networks based on the content of the misclassified documents.

PC106: The computer-implemented method of PC101, wherein:

the class definition of each document class is defined pursuant to a Named Entity Recognition Model, and wherein modifying the class definition of the class to move the class definition in semantic space away from the misclassified documents comprises updating the class definition using named entities in the misclassified documents.

PC111. The computer-implemented method of PC101, the method further comprising:

identifying each misclassified document from the test set; for each such identified misclassified document, identifying the misclassified document's pre-specified class assignment, to produce a set of target classes; and for each target class of the set of target classes, modifying the class definition of said target class to move the class definition in semantic space toward said misclassified document.

PC112: The computer-implemented method of PC111, wherein:

the class definition of each document class is defined pursuant to a Language Statistical Model, and wherein modifying the class definition of the target class to move the class definition in semantic space toward the misclassified document comprises updating the class definition by updating the weights of characteristic words and/or combinations used in the Language Statistical Model based on the characteristic words and/or combinations in the subset of misclassified documents.

PC113: The computer-implemented method of PC111, wherein:

the class definition of each document class is defined pursuant to a Neural Network Model, and wherein modifying the class definition of the class to move the class definition in semantic space toward the misclassified document comprises retraining the neural networks based on the content of the misclassified documents.

PC114: The computer-implemented method of PC101, wherein:

the class definition of each document class is defined pursuant to a Named Entity Recognition Model, and wherein modifying the class definition of the class to move the class definition in semantic space toward the misclassified document comprises updating the class definition using named entities in the misclassified documents.

PC115: The computer-implemented method of PC111, the method further comprising:

identifying each misclassified document from the test set; for each such identified misclassified document, identifying the class vector corresponding to said misclassified document's pre-specified class assignment, to produce a set of target class vectors; and for each target class vector of the set of target class vectors, moving said target vector in semantic space closer to the embedding vectors of each test document that (i) has said class as its pre-specified class and that (ii) is also a misclassified document, by:

updating said target class vector as the mean of (a) its set of pre-specified document vectors and (b) embedding vectors of each test document that (i) has said class as its pre-specified class and that (ii) is also a misclassified document.

PC116. The computer-implemented method of PC101, further comprising, subsequent to producing the reduced test set:

classifying each document of the plurality of test documents in the reduced test set into a class selected from a plurality of document classes, such that each class has a new plurality of correctly classified test documents and a new set of misclassified test documents; and subsequently for each document class of the plurality of document classes:

identifying a corresponding subset of misclassified documents;

modifying the class definition of the class using (a) positively weighted correctly classified test documents and (b) negatively weighted misclassified test documents; and removing the new set of misclassified documents from the reduced test set to produce a further reduced test set.

PC117. The method of PC101 each pre-specified class definition is defined by a class vector based on its corresponding set of pre-specified documents, and each document of the test set has a corresponding embedding vector; the method further comprising, subsequent to producing the reduced test set:

classifying each document of the plurality of test documents in the reduced test set into a class selected from a plurality of document classes, such that each class has a new plurality of correctly classified test documents and a new set of misclassified test documents, by:

determining, for each document of the plurality of test documents in the test set, which class vector is closest to the test document's embedding vector, and assigning said test document to the class corresponding to the class vector that is closest to the document's embedding vector, said class being the test document's resulting class; and subsequently for each document class of the plurality of document classes:

identifying a set of test documents from the reduced test set that have been misclassified into said document class by the act of classifying, by:

43 for each test document classified into said document class by the act of classifying, comparing the document's pre-specified class assignment to the test document's resulting class, and determining which of said test documents have a resulting class different from its pre-specified class, each document having a resulting class different from its pre-specified class being a misclassified document;

identifying, from the set of misclassified documents, a corresponding subset of misclassified document vectors;

modifying the class vector of the class by setting said class vector equal to the mean of (a) positively weighted pre-specified document vectors of the class and embedding vectors of the correctly classified test documents and (b) negatively weighted misclassified document vectors; and removing the misclassified documents from the reduced test set to produce a further reduced test set.

PC201: A system configured to perform a method of any of PC101-PC117.

PC202: A non-transitory computer readable medium storing computer-executable code, the computer-executable code comprising code for causing a computer to perform a method of any of PC101-PC117.

Various embodiments of this disclosure may be implemented at least in part in any conventional computer programming language. For example, some embodiments may be implemented in a procedural programming language (e.g., "C"), or in an object-oriented programming language (e.g., "C++"), or in Python, R, Java, LISP or Prolog. Other embodiments of this disclosure may be implemented as preprogrammed hardware elements (e.g., application specific integrated circuits, FPGAs, and digital signal processors), or other related components.

In an alternative embodiment, the disclosed apparatus and methods may be implemented as a computer program product for use with a computer system. Such implementation may include a series of computer instructions fixed either on a tangible medium, such as a non-transient computer readable medium (e.g., a diskette, CD-ROM, ROM, FLASH memory, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of this disclosure may be implemented as a combination of both software (e.g., a computer program product) and hardware. Still other embodiments of this disclosure are implemented as entirely hardware, or entirely software.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads.

The embodiments described above are intended to be merely exemplary; numerous variations and modifications will be apparent to those skilled in the art. All such variations and modifications are intended to be within the scope of the present disclosure as defined in any appended claims.

What is claimed is:

1. A computer-implemented method comprising:
training a natural language processing-based classification system by:
providing a plurality of pre-specified class definitions, wherein each pre-specified class definition of the plurality of pre-specified class definitions is defined pursuant to a Neural Network Model, and each class definition of the plurality of pre-specified class definitions is uniquely associated with a corresponding document class selected from a plurality of document classes;
providing a test set comprising a plurality of test documents, each test document in the test set having a pre-specified class assignment to a class selected from the plurality of document classes;
automatically classifying each document of the plurality of test documents in the test set into a class selected from a plurality of document classes, such that each class has a plurality of correctly classified test documents and a set of misclassified test documents;
for each document class of the plurality of document classes:
identifying a set of test documents from the test set that have been misclassified into said document class by the act of automatically classifying, by:
for each test document classified into said document class by the act of automatically classifying, comparing the document's pre-specified class assignment to the test document's resulting class, and
determining which of said test documents have a resulting class different from its pre-specified class, each document having a resulting class different from its pre-specified class being a misclassified document;
identifying, from the set of misclassified documents, a corresponding subset of misclassified documents;
modifying the class definition of the class to move the class definition in semantic space away from the misclassified documents by retraining a neural network based on content of the misclassified documents; and
removing the misclassified documents from the test set to produce a reduced test set.

2. The computer-implemented method of claim 1, the method further comprising:
identifying each misclassified document from the test set;
for each such identified misclassified document, identifying the misclassified document's pre-specified class assignment, to produce a set of target classes; and
for each target class of the set of target classes, modifying the class definition of said target class to move the class definition in semantic space toward said misclassified document.

3. The computer-implemented method of claim 1, further comprising, subsequent to producing the reduced test set:

classifying each document of the plurality of test documents in the reduced test set into a class selected from a plurality of document classes, such that each class has a new plurality of correctly classified test documents and a new set of misclassified test documents; and subsequently for each document class of the plurality of document classes:

identifying a corresponding subset of misclassified documents;

modifying the class definition of the class using (a) positively weighted correctly classified test documents and (b) negatively weighted misclassified test documents; and removing the new set of misclassified documents from the reduced test set to produce a further reduced test set.

4. A system comprising:

a computer processor coupled to a set of non-transitory computer memories, the non-transitory computer memories storing computer-executable instructions that, when executed by the computer processor, cause the computer processor to perform a process comprising:

training a natural language processing-based classification system by:

providing a plurality of pre-specified class definitions, wherein each pre-specified class definition of the plurality of pre-specified class definitions is defined pursuant to a Neural Network Model, and each class definition of the plurality of pre-specified class definitions is uniquely associated with a corresponding document class selected from a plurality of document classes;

providing a test set comprising a plurality of test documents, each test document in the test set having a pre-specified class assignment to a class selected from the plurality of document classes;

automatically classifying each document of the plurality of test documents in the test set into a class selected from a plurality of document classes, such that each class has a plurality of correctly classified test documents and a set of misclassified test documents;

for each document class of the plurality of document classes:

identifying a set of test documents from the test set that have been misclassified into said document class by the act of automatically classifying, by:

for each test document classified into said document class by the act of automatically classifying, comparing the document's pre-specified class assignment to the test document's resulting class, and determining which of said test documents have a resulting class different from its pre-specified class, each document having a resulting class different from its pre-specified class being a misclassified document;

identifying, from the set of misclassified documents, a corresponding subset of misclassified documents;

modifying the class definition of the class to move the class definition in semantic space away from the misclassified documents by retraining a neural network based on content of the misclassified documents; and removing the misclassified documents from the test set to produce a reduced test set.

5. The system of claim 4, the process further comprising:

identifying each misclassified document from the test set;

for each such identified misclassified document, identifying the misclassified document's pre-specified class assignment, to produce a set of target classes; and for each target class of the set of target classes, modifying the class definition of said target class to move the class definition in semantic space toward said misclassified document.

6. The system of claim 4, wherein the process further includes, subsequent to producing the reduced test set:

classifying each document of the plurality of test documents in the reduced test set into a class selected from a plurality of document classes, such that each class has a new plurality of correctly classified test documents and a new set of misclassified test documents; and subsequently for each document class of the plurality of document classes:

identifying a corresponding subset of misclassified documents;

modifying the class definition of the class using (a) positively weighted correctly classified test documents and (b) negatively weighted misclassified test documents; and removing the new set of misclassified documents from the reduced test set to produce a further reduced test set.

7. A non-transitory computer readable medium storing computer-executable code, the computer-executable code comprising:

code for training a natural language processing-based classification system by:

code for providing a plurality of pre-specified class definitions, wherein each pre-specified class definition of the plurality of pre-specified class definitions is defined pursuant to a Neural Network Model, and each class definition of the plurality of pre-specified class definitions is uniquely associated with a corresponding document class selected from a plurality of document classes;

code for providing a test set comprising a plurality of test documents, each test document in the test set having a pre-specified class assignment to a class selected from the plurality of document classes;

code for automatically classifying each document of the plurality of test documents in the test set into a class selected from a plurality of document classes, such that each class has a plurality of correctly classified test documents and a set of misclassified test documents;

code for, for each document class of the plurality of document classes:

identifying a set of test documents from the test set that have been misclassified into said document class by the act of automatically classifying, by:

for each test document classified into said document class by the act of automatically classifying, comparing the document's pre-specified class assignment to the test document's resulting class, and determining which of said test documents have a resulting class different from its pre-specified class, each document having a resulting class different from its pre-specified class being a misclassified document;

identifying, from the set of misclassified documents, a corresponding subset of misclassified documents;

code for modifying the class definition of the class to move the class definition in semantic space away from the misclassified documents by retraining a neural network based on content of the misclassified documents; and code for removing the misclassified documents from the test set to produce a reduced test set.

8. The non-transitory computer readable medium of claim 7, the computer-executable code further comprising:

code for identifying each misclassified document from the test set;

code for, for each such identified misclassified document, identifying the misclassified document's pre-specified class assignment, to produce a set of target classes; and code for, for each target class of the set of target classes, modifying the class definition of said target class to move the class definition in semantic space toward said misclassified document.

\* \* \* \* \*